US012132584B2

(12) United States Patent
Unagami et al.

(10) Patent No.: US 12,132,584 B2
(45) Date of Patent: Oct. 29, 2024

(54) INCENTIVE DETERMINATION METHOD, SERVER, AND RECORDING MEDIUM

(71) Applicant: Panasonic Intellectual Property Corporation of America, Torrance, CA (US)

(72) Inventors: Yuji Unagami, Osaka (JP); Motoji Ohmori, Osaka (JP); Ayaka Mitani, Osaka (JP); Kakuya Yamamoto, Hyogo (JP); Junji Michiyama, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/197,925

(22) Filed: May 16, 2023

(65) Prior Publication Data

US 2023/0291602 A1    Sep. 14, 2023

Related U.S. Application Data

(63) Continuation of application No. PCT/JP2021/041333, filed on Nov. 10, 2021.

(60) Provisional application No. 63/115,887, filed on Nov. 19, 2020.

(51) Int. Cl.
    *H04L 12/28*    (2006.01)
(52) U.S. Cl.
    CPC ........ *H04L 12/2823* (2013.01); *H04L 12/283* (2013.01)
(58) Field of Classification Search
    CPC ................... H04L 12/2823; H04L 12/283
    See application file for complete search history.

(56) References Cited

U.S. PATENT DOCUMENTS

| 10,929,415 | B1* | 2/2021 | Shcherbakov | ...... G06F 3/04842 |
| 11,048,813 | B2* | 6/2021 | Pitti | ...................... H04L 9/0637 |
| 2012/0239813 | A1* | 9/2012 | Seo | ......................... G06Q 10/08 |
| | | | | 709/226 |

(Continued)

FOREIGN PATENT DOCUMENTS

| JP | 2002-117183 | 4/2002 |
| JP | 2019-79577 | 5/2019 |
| WO | 2017/119281 | 7/2017 |

OTHER PUBLICATIONS

International Search Report (ISR) issued on Feb. 8, 2022 in International (PCT) Application No. PCT/JP2021/041333.

*Primary Examiner* — Todd L Barker
(74) *Attorney, Agent, or Firm* — Wenderoth, Lind & Ponack, L.L.P.

(57) ABSTRACT

A method includes: recording provision record information in which provider identification information which identifies a data provider, data identification information which identifies each of one or more items of provided data generated by a home appliance, and value reference information which serves as a reference for calculating a data value of each of the one or more items of provided data are associated with one another; and when the one or more items of provided data include used data that is data used by a data user, determining an incentive for the data provider of the used data based on the provision record information. The value reference information includes an index value determined by each of a plurality of value indexes.

9 Claims, 21 Drawing Sheets

(56) References Cited

U.S. PATENT DOCUMENTS

2017/0156018 A1\* 6/2017 Li ........................... H04W 4/50
2020/0074102 A1\* 3/2020 Pitti ..................... G06F 21/602

\* cited by examiner

FIG. 3

| Home ID | Home appliance model ID | Individual number | Operation time | Details of operation |
|---|---|---|---|---|
| JP10-200153 | Pa-TV-19-42-VX1 | 19-08-10-02224 | 2020-10-08-05:25:15 | Power on |
| JP10-200153 | Pa-TV-19-42-VX1 | 19-08-10-02224 | 2020-10-08-05:25:18 | Change channel: 1ch |
| JP10-200153 | Hi-RF-17-500-S2 | 17-10-03-28341 | 2020-10-08-05:26:10 | First door: open |
| JP10-200153 | Ri-ES-18-201 | 18-02-07-00113 | 2020-10-08-05:26:40 | Second burner: turn on |
| JP10-200153 | Ri-ES-18-201 | 18-02-07-00113 | 2020-10-08-05:26:41 | Second burner: set to moderate |
| ... | ... | ... | ... | ... |

FIG. 4

| Home appliance usage history ID | Home ID | Home appliance model ID | Individual number | Operation time | Details of operation | Value reference information | | |
|---|---|---|---|---|---|---|---|---|
| | | | | | | Level of privacy | Prevalence rate | Seasonal/temporal change degree |
| 20201008-0527-00013 | JP10-200153 | Pa-TV-19-42-VX1 | 19-08-10-02224 | 2020-10-08-05:25:15 | Power on | 0 | 0 | 1 |
| 20201008-0527-00014 | JP10-200153 | Pa-TV-19-42-VX1 | 19-08-10-02224 | 2020-10-08-05:25:18 | Change channel: 1ch | 3 | 0 | 1 |
| 20201008-0527-00015 | JP10-200153 | Hi-RF-17-500-S2 | 17-10-03-28341 | 2020-10-08-05:26:10 | First door: opening and closing | 0 | 0 | 1 |
| 20201008-0527-00017 | JP10-200153 | Ri-ES-18-201 | 18-02-07-00113 | 2020-10-08-05:26:40 | Second burner: turn on | 0 | 1 | 1 |
| 20201008-0527-00018 | JP10-200153 | Ri-ES-18-201 | 18-02-07-00113 | 2020-10-08-05:26:41 | Second burner: set to moderate | 1 | 1 | 1 |
| ... | ... | ... | ... | ... | ... | ... | ... | ... |
| 20201008-0837-02184 | JP10-200153 | Hi-RF-17-500-S2 | 17-10-03-28341 | 2020-10-08-08:36:27 | Second door: opening and closing | 0 | 0 | 0 |
| ... | ... | ... | ... | ... | ... | ... | ... | ... |

FIG. 5

| Time period | Home ID | Home appliance model ID | Individual number | Amount of provided information |
|---|---|---|---|---|
| From 00:00:00 on October 8, 2020 to 23:59:59 on October 8, 2020 | JP10-200153 | Pa-TV-19-42-VX1 | 19-08-10-02224 | 135 |
| | JP10-200153 | Hi-RF-17-500-S2 | 17-10-03-28341 | 87 |
| | JP10-200153 | Ri-ES-18-201 | 18-02-07-00113 | 23 |
| | JP10-200153 | DK-AC-16-EX402 | 16-11-03-04675 | 18 |
| | JP10-200153 | Pa-MW-19-BS901 | 19-02-01-00012 | 9 |
| ... | ... | ... | ... | ... |

FIG. 6

| User ID | Home appliance usage history ID | Home ID | Home appliance model ID |
|---|---|---|---|
| A2356 | 20200101-0420-00011 | JP01-000112 | Pa-WM-13-60-SP1 |
| A2356 | 20200101-0420-00147 | JP43-100152 | Hr-WM-18-80-DR3 |
| ⋮ | ⋮ | ⋮ | ⋮ |
| A2356 | 20200101-0420-00012 | JP01-000112 | Pa-WM-13-60-SP1 |
| A2356 | 20200101-0420-00148 | JP43-100152 | Hr-WM-18-80-DR3 |
| ⋮ | ⋮ | ⋮ | ⋮ |
| A2356 | 20201103-2359-13487 | JP10-200153 | Pa-VR-19-VX800 |
| A2356 | 20201103-2359-13501 | JP33-090879 | So-VR-17-BR200 |
| ⋮ | ⋮ | ⋮ | ⋮ |

FIG. 10

| User ID | Time of application | Details of usage application |
|---|---|---|
| A2356 | 10:39 on November 7, 2020 | Survey on timer settings of washing machine in 2020 |
| A2356 | 10:40 on November 7, 2020 | Information on used detergent after August 2020 |
| A2356 | 10:50 on November 7, 2020 | Recording status at 23:00 on November 3, 2020 |
| ... | ... | ... |

INCENTIVE DETERMINATION METHOD, SERVER, AND RECORDING MEDIUM

CROSS REFERENCE TO RELATED APPLICATIONS

This is a continuation application of PCT International Application No. PCT/JP2021/041333 filed on Nov. 10, 2021, designating the United States of America, which is based on and claims priority of U.S. Provisional Patent Application No. 63/115,887 filed on Nov. 19, 2020. The entire disclosures of the above-identified applications, including the specifications, drawings and claims are incorporated herein by reference in their entirety.

FIELD

The present disclosure relates to an incentive determination method, server, and recording medium.

BACKGROUND

Patent Literature (PTL) 1 discloses a technique, in which, using a distributed file sharing technique for sharing electronic file information such as HTML, PDF, and text, information (data) is collected from each Internet of Things (IoT) device, and is made autonomously available on a WEB service and shared on a distributed file sharing network formed by each IoT gateway.

CITATION LIST

Patent Literature

PTL 1: Japanese Unexamined Patent Application Publication No. 2019-79577

SUMMARY

Technical Problem

However, the method disclosed in PTL 1 does not consider incentives for data providers, and thus, has a problem that it is difficult to efficiently collect data.

The present disclosure has been conceived in view of the above circumstances. An object of the present disclosure is to provide a control method, a server, and a recording medium capable of efficiently collecting data.

Solution to Problem

A method according to one aspect of the present disclosure is a method which includes: recording provision record information in which provider identification information, data identification information, and value reference information are associated with one another, the provider identification information identifying each of one or more data providers who provide data generated by one or more home appliances, the data identification information identifying each of one or more items of provided data that are data provided by the one or more data providers, the value reference information serving as a reference for calculating a data value of each of the one or more items of provided data; and when the one or more items of provided data include used data that is data used by a data user, determining an incentive for a data provider of the used data among the one or more data providers based on the provision record information, wherein the value reference information includes an index value determined by each of a plurality of value indexes.

A server according to one aspect of the present disclosure is a server which determines an incentive for one or more data providers who provide data generated by one or more home appliances. The server includes: a processor; and a memory. Using the memory, the processor: records provision record information in which provider identification information, data identification information, and value reference information are associated with one another, the provider identification information identifying each of the one or more data providers, the data identification information identifying each of one or more items of provided data that are data provided by the one or more data providers, the value reference information serving as a reference for calculating a data value of each of the one or more items of provided data; and when the one or more items of provided data include used data that is data used by a data user, determines an incentive for a data provider of the used data among the one or more data providers based on the provision record information, and the value reference information includes an index value determined by each of a plurality of value indexes.

It should be noted that these general and specific aspects may be implemented using a system, a method, an integrated circuit, a computer program, or a non-transitory computer-readable recording medium such as a CD-ROM, or any combination of systems, methods, integrated circuits, computer programs, and non-transitory recording media.

Advantageous Effects

With the incentive determination method and the like according to the present disclosure, data can be efficiently collected.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 illustrates an example of a data format of each operation log transmitted from a connection device according to Embodiment 1.

FIG. 4 illustrates an example of a data format of each operation log recorded in a usage history database (DB) according to Embodiment 1.

FIG. 5 illustrates an example of a data format of provision record information recorded in a provision record DB according to Embodiment 1.

FIG. 6 illustrates an example of a data format of usage record information recorded in a usage record DB according to Embodiment 1.

FIG. 10 illustrates an example of a data format of each usage request according to Embodiment 1.

DESCRIPTION OF EMBODIMENTS

Figure 1:
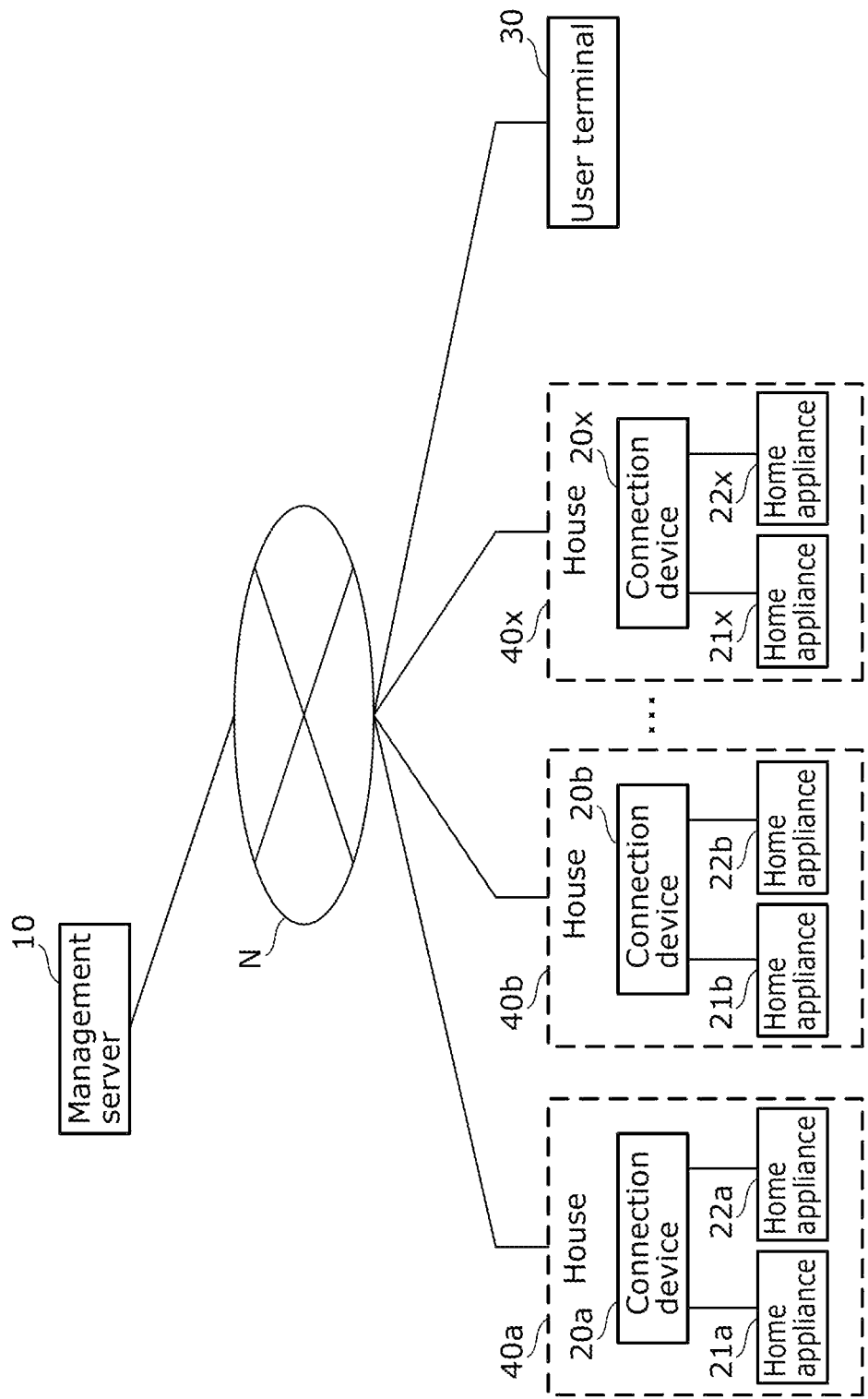
FIG. 1 illustrates an example of a configuration of a management system according to Embodiment 1.

A method according to one aspect of the present disclosure is a method which includes: recording provision record information in which provider identification information, data identification information, and value reference information are associated with one another, the provider identification information identifying each of one or more data providers who provide data generated by one or more home appliances, the data identification information identifying each of one or more items of provided data that are data provided by the one or more data providers, the value reference information serving as a reference for calculating a data value of each of the one or more items of provided data; and when the one or more items of provided data include used data that is data used by a data user, determining an incentive for a data provider of the used data among the one or more data providers based on the provision record information, wherein the value reference information includes an index value determined by each of a plurality of value indexes.

With this, in accordance with the provided data used by a user among one or more items of provided data provided by one or more data providers, an incentive for the data provider of the provided data is determined based on an index value associated with the provided data and determined by each of a plurality of value indicators. As described above, since the provided data is associated with the index value determined by each of value indexes, the data value of the provided data can be determined in advance by the value indexes. In addition, since the index values determined by the value indexes are associated with the provided data, even if a large value is calculated for the index value of one value index and a biased evaluation is made, the bias can be reduced, and the data value of the provided data can be determined to an appropriate value. Accordingly, the incentive for the data provider can be appropriately determined, and the provider can be prompted to provide data. As a result, data can be collected efficiently.

Moreover, it may be that the determining includes: identifying, based on the provision record information, (i) provided data associated with data identification information that is identical to data identification information which identifies the used data, and (ii) value reference information of the provided data identified and a data provider of the provided data identified; and determining an incentive for the data provider identified, based on the value reference information identified.

Moreover, it may be that the incentive determination method further includes: recording usage record information in a usage record database, the usage record information including data identification information which identifies the used data; and identifying a total number of uses of the provided data identified, based on the usage record database, and the determining includes determining an incentive for the data provider identified, based on the value reference information identified and the total number of uses identified.

Moreover, it may be that the plurality of value indexes in the value reference information include at least two of (i) a value index based on a type of the provided data, (ii) a value index based on a type of a home appliance that generated the provided data, or (iii) a value index based on a period when the provided data was generated by the home appliance.

Moreover, it may be that the incentive determination method further includes: recording the provision record information in a provision record database, and it may be that in the recording of the provision record information in the provision record database, the provision record information is recorded in the provision record database by causing the computer to transfer first transaction data including the provision record information to an other computer, and to store a first block including the first transaction data in a distributed ledger managed by the computer, and in the recording of the usage record information in the usage record database, the usage record information is recorded in the usage record database by causing the computer to transfer second transaction data including the usage record information to the other computer, and to store a second block including the second transaction data in the distributed ledger managed by the computer.

With this, it is possible to store provision record information and usage record information in a distributed ledger, so that an incentive for the provider can be determined using the provision record information and the usage record information that are difficult to be tampered with. Accordingly, it is possible to more appropriately determine the incentive for the provider.

Moreover, it may be that each of the distributed ledger held by the computer and a distributed ledger held by the other computer includes a contract code for executing, based on the second transaction data, the identifying of the value reference information and the data provider and the determining of the incentive, and in the identifying of the value reference information and the data provider and the determining of the incentive, the identifying of the value reference information and the data provider and the determining of the incentive are executed by executing the contract code included in the distributed ledger of the computer when the second transaction data is obtained.

Moreover, it may be that the provision record information further includes a hash value of the provided data.

Moreover, it may be that the determining of the incentive includes: calculating, for each of a plurality of items of the used data, a value of the used data based on (i) an index value determined by each of a plurality of value indexes included in the value reference information identified and (ii) a value associated in advance with each of the plurality of value indexes; and determining the incentive based on the value of the used data calculated, the value associated in advance is determined to change over time, and the incentive determination method further includes transferring third transaction data including the value determined to an other computer and storing a third block including the third transaction data in a distributed ledger managed by the computer, the transferring and the storing being performed by the computer.

A server according to one aspect of the present disclosure is a server which determines an incentive for one or more data providers who provide data generated by one or more home appliances. The server includes: a processor; and a memory. Using the memory, the processor: records provision record information in which provider identification information, data identification information, and value reference information are associated with one another, the provider identification information identifying each of the one or more data providers, the data identification information identifying each of one or more items of provided data that are data provided by the one or more data providers, the value reference information serving as a reference for calculating a data value of each of the one or more items of provided data; and when the one or more items of provided data include used data that is data used by a data user, determines an incentive for a data provider of the used data among the one or more data providers based on the provision record information, and the value reference information includes an index value determined by each of a plurality of value indexes.

It should be noted that these general and specific aspects may be implemented using a system, a method, an integrated circuit, a computer program, or a non-transitory computer-readable recording medium such as a CD-ROM, or any combination of systems, methods, integrated circuits, computer programs, or non-transitory recording media.

Hereinafter, embodiments will be described with reference to the drawings. It should be noted that each of the embodiments described below shows a specific example of the present disclosure. In other words, the numerical values, shapes, materials, structural elements, the arrangement and connection of the structural elements, steps, the processing order of steps, etc., illustrated in the following embodiments are mere examples, and therefore do not limit the present disclosure. Moreover, among the structural elements in the following embodiments, those not recited in any of the independent claims defining the most generic part of the inventive concept are not necessarily necessary for achieving the object of the present disclosure, but are described as optional structural elements belonging to a more preferred embodiment.

Embodiment 1

First, a system configuration according to the present disclosure will be described.

Hereinafter, a configuration of a management system and the like according to the present embodiment will be described with reference to the drawings.

Management System

FIG. 1 illustrates an example of a configuration of a management system according to Embodiment 1.

As illustrated in FIG. 1, the management system according to the present embodiment includes, for example, management server 10, connection devices 20a to 20x, home appliances 21a to 21x and 22a to 22x, and user terminal 30. These are connected by network N. Network N is, for example, the Internet, or a carrier network such as a mobile phone, but may be formed of any communication line or network. One of connection devices 20a to 20x and two of home appliances 21a to 21x and 22a to 22x are associated with one of houses 40a to 40x. For example, connection device 20a and home appliances 21a and 22a are associated with house 40a of user A. Houses 40a to 40x are not limited to houses, but may be facilities such as factories, companies, and warehouses. Although it has been described that two home appliances are associated with one house, the present disclosure is not limited to such an example. It may be that one or more home appliances are associated with one house.

In the following description, although each of connection device 20a to connection device 20x may also be referred to as connection device 20, connection device 20a to connection device 20x may also be referred to as connection device A to connection device X. In a similar manner, although each of home appliances 21a to 21x may also be referred to as home appliance 21, and each of home appliances 22a to 22x may also be referred to as home appliance 22, home appliances 21a to 21x may also be referred to as home appliances A1 to X1 and home appliances 22a to 22x may also be referred to as home appliances A2 to X2. In a similar manner, although each of houses 40a to 40x may also be referred to as house 40, houses 40a to 40x may also be referred to as house A to house X.

Hereinafter, management server 10 will be described.

Management Server 10

Management server 10 is an example of a device which collects operation logs of home appliances 21a to 21x and 22a to 22x provided in houses 40a to 40x, and provides data users with analytical data generated based on the collected operation logs. Here, each operation log is an example of provided data. Management server 10 determines an incentive to be given to the user (data provider) of the house which provided the operation logs used by a data user. The incentive is determined in accordance with the usage record of the operation logs provided by the home appliances of the data provider. Management server 10 may pay the determined incentive for the data provider. Management server 10 may also calculate the usage fee of the operation logs used by the data user and collect the calculated usage fee from the data user. The incentive may be, for example, paid to the data provider from the usage fee collected from the data user. The data user may be referred to as a user. In a similar manner, the data provider may be referred to as a provider. The data provider may own a provider terminal. The provider terminal is, for example, a computer such as a smartphone, a tablet terminal, and a personal computer. The provider terminal may include, for example, a display function, a voice function, a vibration function, and a light emitting function. The provider terminal may use the display function, the voice function, the vibration function, the light emitting function or the like to notify the data provider of the provider terminal of the completion of the incentive payment.

Figure 2:
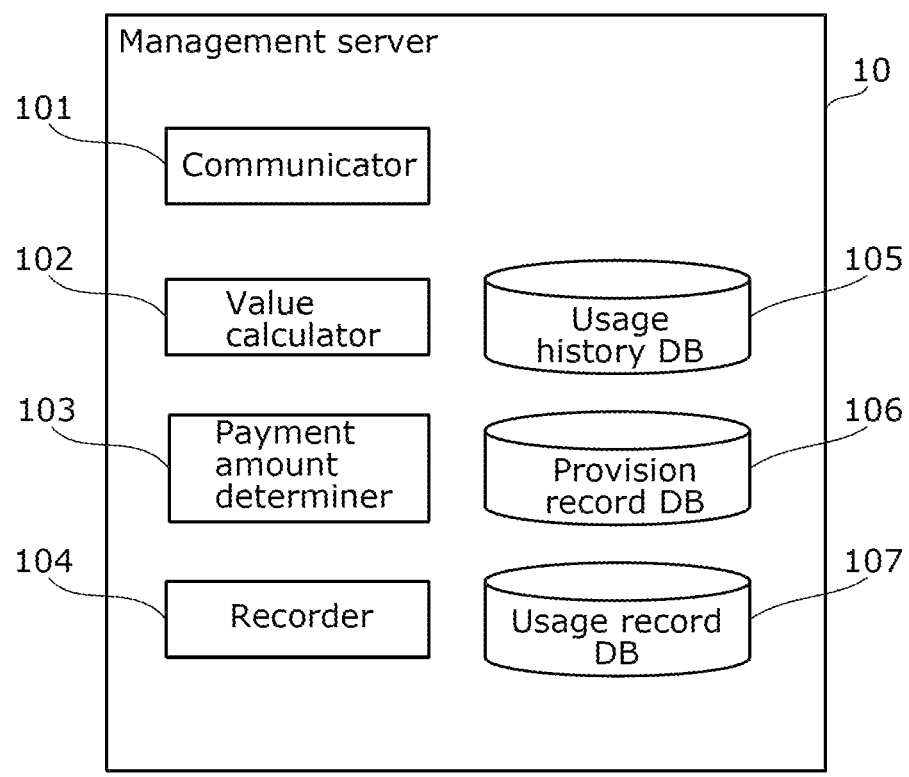
FIG. 2 illustrates an example of a configuration of a management server according to Embodiment 1.

FIG. 2 illustrates an example of a configuration of the management server according to Embodiment 1.

As illustrated in FIG. 2, management server 10 includes communicator 101, value calculator 102, payment amount determiner 103, recorder 104, usage history database (DB) 105, provision record DB 106, and usage record DB 107. Management server 10 can be realized by a processor executing a predetermined program using a memory. Management server 10 is an example of a computer. Hereinafter, each structural element will be described.

Communicator 101 performs communication with a plurality of connection devices 20 via network N. Communicator 101 receives, from connection devices 20, the operation logs of home appliances 21 and 22 connected to connection devices 20. In other words, communicator 101 receives the operation logs of home appliances 21a to 21x and 22a to 22x from connection devices 20a to 20x. The details of the operation logs will be described later.

Moreover, communicator 101 performs communication with user terminal 30 via network N. Communicator 101 receives an operation log usage request from user terminal 30. Communicator 101 transmits the operation logs that are in accordance with the received usage request or the analytical data generated based on the operation logs to user terminal 30. The details of the analytical data will be described later.

The communication performed by communicator 101 may be performed by transport layer security (TLS), and the encryption key for TLS communication may be held by communicator 101.

Value calculator 102 assigns, to each of the collected operation logs, value reference information corresponding to the operation log. The value reference information is information that serves as a reference for calculating the data value of the operation log. The value reference information includes the index values determined by a plurality of value indexes. Specifically, the value indexes in the value reference information may include at least two of: a first value index based on the type of the operation log; a second value index based on the type of the home appliance that generated the operation log; or a third value index based on the period when the operation log was generated by the home appliance. In the present embodiment, the higher the index value of each of the first value index, the second value index, and the third value index, the higher the value. It does not have to be that the higher the index value, the higher the value, and it may be that the higher the index value, the lower the value.

The first value index based on the type of an operation log is an index indicating the level of personal privacy associated in advance with the type of the operation log. The level of personal privacy indicates, for example, that the higher the index value, the higher the level of privacy than the public level. For example, the first value index may be indicated by four levels of index values of "3: very high", "2: high", "1: slightly high", and "0: irrelevant". The index value of the first value index may be associated by a table in advance with the type of operation log. The table may be further classified according to the type of the home appliance.

For example, when the home appliance is a weight scale and the operation log is the measurement result of the body weight, the index value of the first value index of the operation log may be set to "3". For example, when the home appliance is a TV and the operation log is viewing data, the index value of the first value index of the operation log may be set to "2". The viewing data includes a viewing channel, a viewing time period (viewing start time, viewing end time), and the like. For example, when the home appliance is a microwave and the operation log is an operation performed on the microwave, the index value of the first value index of the operation log may be set to "1". For example, when the home appliance is an air conditioner and the operation log is the temperature settings of the air conditioner, the index value of the first value index of the operation log may be set to "0". For example, when the home appliance is a lighting device and the operation log is the power-on of the lighting device, the index value of the first value index of the operation log may be set to "0".

The second value index based on the type of the home appliance that generated the operation log is an index indicating the prevalence rate of a certain type of home appliance. The prevalence rate indicates, for example, that the higher the index value, the larger the proportion of the houses which have this type of home appliance to all the houses. For example, the second value index may be indicated by three levels of index values of "2: low", "1: medium", and "0: high". The index value of the second value index may be associated by a table in advance with the type of the home appliance that generated the operation log. The type of a home appliance may be a group of home appliances classified by home appliances having a common function, a group of home appliances classified by model, or a group of home appliances classified by manufacturer.

For example, when the home appliance is a TV, the index value of the second value index of the operation log generated by the home appliance may be set to "0". For example, when the home appliance is an air purifier, the index value of the second value index of the operation log generated by the home appliance may be set to "1". For example, when the home appliance is a roaster, the index value of the second value index of the operation log generated by the home appliance may be set to "2".

The third value index based on the period when the operation log was generated by the home appliance is an index indicating the degree of change in season or time when the operation log was generated. The degree of change in season or time is higher when a sudden change in season, weather, or the like occurs. For example, the degree of change increases with a decrease in the frequency of an event held when the operation log was generated. The event that is held at a lower frequently may be, for example, an event that is held once every few years, such as the Olympic Games, the Soccer World Cup, and the World Expo, or once a year such as the year change period. For example, the operation log relating to the cooling function of an air conditioner in winter occurs less frequently, and thus, the degree of change may be set to be high. The operation log generated when a natural disaster such as a heavy rain or an earthquake occurs may be set to the degree of change that is in accordance with the frequency of occurrence of the natural disaster.

For example, the third value index may be indicated by four levels of index values of "3: very high", "2: high", "1: medium", and "0: low" in descending order of the degree of change. The index value of the third value index may be associated by a table in advance with the period when the above-mentioned event occurred, the period when a natural disaster occurred, the period when a climate change occurred, or the period other than the above-mentioned periods.

Moreover, value calculator 102 calculates, for each operation log, the data value based on the value reference information assigned to the operation log. Value calculator 102 calculates the value of each operation log based on the index values determined by the first value index, the second value index, and the third value index included in the value reference information assigned to the operation log to be calculated, and the values associated in advance with the first value index, the second value index, and the third value index. For example, value calculator 102 may calculate, as the data value, the value corresponding to the total of the index values of the first value index, the second value index, and the third value index included in the value reference information assigned to the operation log to be calculated. The data value may be calculated such that the higher the total value, the higher the data value. In other words, the data value may be set to a value associated with the total value in a monotonically increasing function. Instead of the total value, a value obtained by performing a weighted addition on the index value of each value index may be used.

Tables in which the index values of the first value index, the second value index, and the third value index are associated with operation logs may be determined to change over time. For example, in the table in which the index value of the first value index is associated with each operation log, the index value associated with the type of the operation log may change depending on the type of the operation log. For example, in the table in which the index value of the second value index is associated with each operation log, the index value associated with the type of the home appliance for which the operation log was generated may change depending on the type of the home appliance. For example, in the table in which the index value of the third value index is associated with each operation log, the index value associated with the period when the operation log was generated may change depending on the period.

The values associated in advance with the index values determined by the first value index, the second value index, and the third value index may be determined to change over time.

The data value may be calculated using the latest tables and the latest pre-associated values when the operation log is generated. In this case, a data value in addition to the value reference information may be added to the operation log, or a data value may be added to the operation log instead of the value reference information.

The data value may be calculated using the latest tables and the latest pre-associated values when a usage request for the operation log is received. In this case, it may be that the value reference information has not been added to the operation log, and the value reference information determined by using the latest tables when the usage request is received is added to the operation log. Then, the data value may be calculated using the value reference information added at that time and the latest pre-associated values.

Value calculator 102 may calculate a higher data value as the data value to be given to the operation log, as the frequency of occurrence of the operation log is lower.

Payment amount determiner 103 calculates the usage fee for one or more operation logs used by a specific data user. Specifically, payment amount determiner 103 determines the used data to be processed based on usage record DB 107. Payment amount determiner 103 determines one of one or more operation logs used by a specific data user as used data to be processed. Payment amount determiner 103 may sequentially determine each of the one or more operation logs as used data to be processed. Payment amount determiner 103 identifies, as one or more operation logs used by the specific data user, the operation logs associated with user identification information (user ID) which identifies the specific data user in usage record DB 107.

Payment amount determiner 103 then identifies, in provision record DB 106, the provided data which is an operation log associated with the data identification information that is identical to the data identification information of the determined used data to be processed, and identifies the data value and the data provider of the identified provided data. Payment amount determiner 103 identifies, for example, the provider identification information (provider ID) recorded in association with the data identification information to identify the data provider indicated by the provider identification information.

Payment amount determiner 103 may identify the value reference information recorded in association with the data identification information instead of identifying the data value recorded in association with the data identification information. Payment amount determiner 103 then may cause value calculator 102 to calculate the data value based on the identified value reference information, and obtain the calculated data value.

Payment amount determiner 103 determines an incentive to be given to the determined data provider based on the determined data value. The incentive may be set by the data value itself, may be calculated by subtracting a certain value from the data value, may be calculated by multiplying the data value by a certain value, may be calculated by subtracting a value corresponding to the data value from the data value, or may be calculated by multiplying the data value by the value corresponding to the data value.

Payment amount determiner 103 may perform the above calculation not only for one or more operation logs used by a specific data user, but also for one or more operation logs used by each of a plurality of data users. With this, every time one operation log is used, payment amount determiner 103 calculates an incentive to be given to the data provider of the operation log, so that an incentive is determined only for the amount of used operation logs for the data provider of the operation log. Accordingly, payment amount determiner 103 is capable of calculating the incentive for each data provider by summing, for the data provider, the incentive calculated for each usage of one operation log.

In provision record DB 106, each operation log and the number of times the operation log was used may be recorded in association with each other. In this case, payment amount determiner 103 identifies the data value of an operation log, and multiplies the identified data value by the number of uses, so that payment amount determiner 103 is capable of easily calculating, for each operation log, an incentive to be paid to the data provider for each use of the operation log. In other words, the incentive for the data provider may be determined based on the data value and the number of uses of the identified provided data.

The incentives may be calculated every predetermined period such as every month or every two months. When an incentive is calculated, the calculated incentive is paid to the data provider.

Payment amount determiner 103 identifies, for each of one or more data users, the data value of each of one or more operation logs used by the data user and sums the data values of the one or more operation logs to calculate the usage fee of a specific data user. The usage fee may be calculated every predetermined period such as every month. When the usage fee is calculated, the calculated usage fee is collected from the data user.

The operation log for which the incentive is calculated is an operation log which was used by the data user and whose incentive to be paid to the data provider has not been calculated yet. Moreover, the operation log for which the usage fee is calculated is an operation log which was used by the data user and whose usage fee to be collected from the data user has not been calculated yet. In other words, the operation logs for which the incentives are to be calculated are one or more operation logs used after one or more operation logs for which the incentives were calculated last time were used. When the usage fee is calculated for each predetermined period, the operation log for which the incentive is calculated is the operation log used by the data user in the latest predetermined period.

Recorder 104 records one or more operation logs of home appliances 21a to 21x and 22a to 22x received by communicator 101 in usage history DB 105. Each of the one or more operation logs includes, for example, provider identification information (provider ID) which identifies the data provider of the operation log, type information indicating the type of the home appliance that generated the operation log, an individual number which uniquely identifies the home appliance that generated the operation log, time information indicating the time when the operation log was generated, and details information indicating the details of the operation log.

FIG. 3 illustrates an example of a data format of each operation log transmitted from a connection device according to Embodiment 1.

Each row in the table illustrated in FIG. 3 indicates one operation log. In FIG. 3, a home ID is an ID assigned to each house 40, and is an example of provider identification information. The home ID may be, for example, an ID assigned by connection device 20. For example, JP10-200153 indicates the 200153-th house 40 in the 10th prefecture (for example, Fukushima prefecture) in Japan.

A home appliance model ID is an ID assigned to each home appliance model, and is an example of type information. For example, Pa-TV-19-42-VX1 indicates that the home appliance is a year 2019 model and 42-inch VX1 model TV manufactured by company Pa. For example, Hi-RF-17-500-S2 indicates that the home appliance is a year 2017 model and S2 model with 500 L capacity refrigerator manufactured by company Hi. For example, Ri-ES-18-201 indicates that the home appliance is a year 2018 model and 201 model electric stove manufactured by company Ri.

An individual number is an ID assigned to each home appliance. For example, 19-08-10-02224 indicates that the home appliance is the $02224^{th}$ home appliance manufactured on manufacturing equipment line 10 in August 2019.

An operation time is an example of time information indicating the time when the home appliance was operated and the time when the operation log was generated. For example, 2020-10-08-05:25:15 indicates that the home appliance was operated at 5:25:15 on Oct. 8, 2020.

Details of operation are an example of details information indicating the details of the operation performed on the home appliance and the details of the operation log.

FIG. 4 illustrates an example of a data format of each operation logs recorded in usage history DB according to Embodiment 1.

Each row in the table illustrated in FIG. 4 indicates one operation log. Each operation log in FIG. 4 is information obtained by adding a home appliance usage history ID and value reference information to each operation log in FIG. 3.

The home appliance usage history ID is information added to each of one or more operation logs, and is an example of data identification information.

The value reference information is information added to each of one or more operation logs, and is information calculated by value calculator 102. The details of the value reference information will be omitted because they have been described in the description of value calculator 102.

Recorder 104 records, in provision record DB 106, provision record information in which provider identification information (provider ID) which identifies the data provider of one or more operation logs received by communicator 101, data identification information which identifies each of the one or more operation logs, and value reference information assigned by value calculator 102 are associated with one another.

FIG. 5 illustrates an example of a data format of the provision record information recorded in the provision record DB according to Embodiment 1.

Each row of the table illustrated in FIG. 5 indicates the provision record information of the operation logs of one home appliance. Each item of provision record information in FIG. 5 includes a time period, a home ID, a home appliance model ID, an individual number, and the amount of provided information.

The time period indicates the time period including the times when the provision record information was provided. The amount of provided information indicates, for each home appliance, the number of operation logs of the home appliance which were provided during the time period.

Recorder 104 records, in usage record DB 107, the operation logs transmitted by communicator 101 to user terminal 30 in response to the usage request or the operation logs based on the analytical data. Every time the operation log is transmitted to user terminal 30, recorder 104 records the operation log in usage record DB 107 as usage record information. In other words, recorder 104 records a user ID and an operation log ID in association with each other in usage record DB 107 as the usage record information.

FIG. 6 illustrates an example of a data format of usage record information recorded in the usage record DB according to Embodiment 1.

Each row of the table illustrated in FIG. 6 indicates one item of usage record information. Each item of usage record information in FIG. 6 includes a user ID, a home appliance usage history ID, a home ID, and a home appliance model ID.

Connection Device 20

Figure 7:
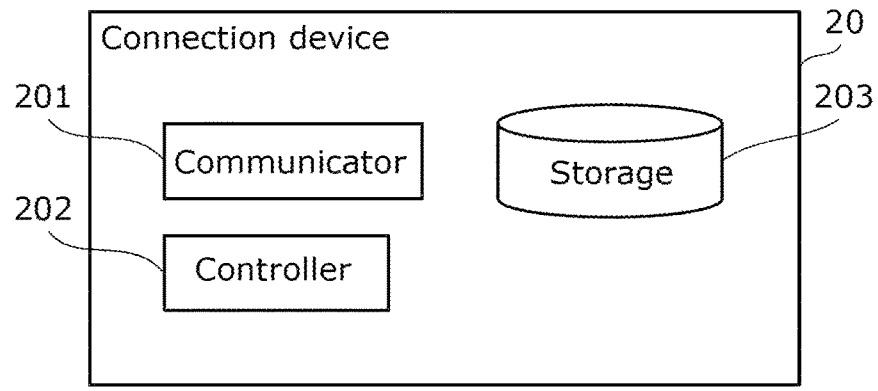
FIG. 7 illustrates an example of a configuration of a connection device according to Embodiment 1.

FIG. 7 illustrates an example of a configuration of a connection device according to Embodiment 1.

Connection device 20 is communicably connected to home appliances 21 and 22. Connection device 20 transmits, to management server 10 via network N, the operation logs obtained by transmission from home appliances 21 and 22, or obtained by connection of connection device 20 to home appliances 21 and 22. Connection device 20 may be a router including at least one of a wireless LAN function or a wired LAN function. Connection device 20 includes communicator 201, controller 202, and storage 203. Connection device 20 may be realized by a processor executing a predetermined program using a memory. Hereinafter, each structural element will be described.

Communicator 201 performs communication with home appliances 21 and 22. With this, communicator 201 obtains the operation logs of home appliances 21 and 22 from home appliances 21 and 22. Communicator 201 also performs communication with management server 10 via network N. Communicator 201 transmits, for example, the operation logs obtained from home appliances 21 and 22 to management server 10. Communicator 201 may be connected to home appliances 21 and 22 by wireless communication or by wired communication.

Controller 202 stores the operation logs obtained by communicator 201 in storage 203. Controller 202 may control the timing when the operation log is obtained from each of home appliances 21 and 22 by controlling communicator 201. The timing when the operation log is obtained may be every predetermined period, at a predetermined time, or at a time satisfying a predetermined condition. Controller 202 may also control the timing when the operation logs stored in storage 203 are transmitted to management server 10 by controlling communicator 201. By controlling communicator 201, controller 202 may collectively transmit a plurality of operation logs stored in storage 203 to management server 10. The timing when the operation log is transmitted may be every predetermined period, at a predetermined time, or at a time satisfying a predetermined condition. Controller 202 is capable of reducing the processing amount of the processor compared to the case where the operation log is obtained or transmitted each time, by controlling the timing of the obtainment or transmission of the operation log.

Storage 203 stores the operation logs obtained by communicator 201. Storage 203 may store information necessary for the operation of connection device 20 such as a program.

Home Appliance 21

Figure 8:
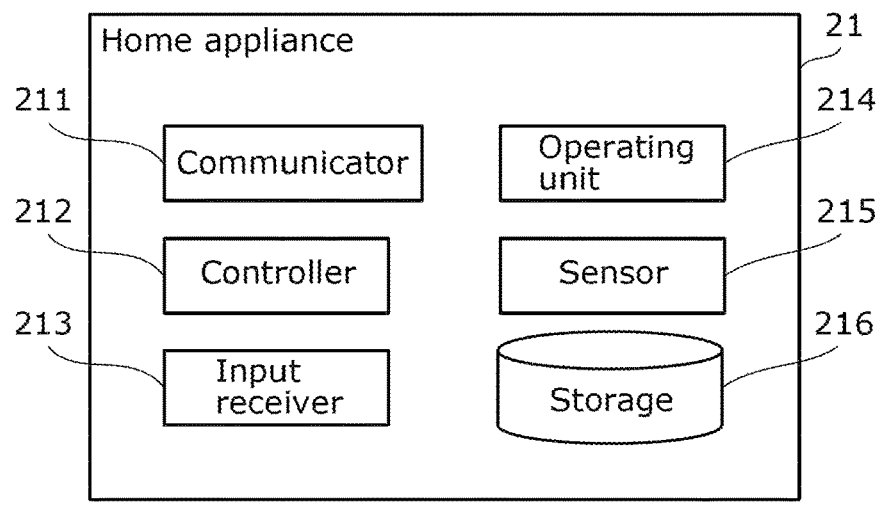
FIG. 8 illustrates an example of a configuration of a home appliance according to Embodiment 1.

FIG. 8 illustrates an example of a configuration of a home appliance according to Embodiment 1.

Home appliance 21 is provided in house 40. Home appliance 21 is, for example, a TV, a recorder, an air conditioner, a lighting device, a washing machine, a refrigerator, and a door phone. Home appliance 21 may be household equipment such as a solar power generator, a fuel cell, an electric shutter, a water heater, and an electronic lock. Home appliance 21 may also be a healthcare device such as a body composition monitor, a blood pressure monitor, a thermometer, and a wearable terminal. Home appliance 21 includes communicator 211, controller 212, input receiver 213, operating unit 214, sensor 215, and storage 216. Controller 212 in home appliance 21 can be realized by a processor executing a predetermined program using a memory. Controller 212 in home appliance 21 may be realized by a dedicated circuit. Since home appliance 22 has the same configuration as home appliance 21, the description thereof will be omitted. Hereinafter, each structural element will be described.

Communicator 211 performs communication with connection device 20. Communicator 211 may perform communication with management server 10 via network N without going through connection device 20. Communicator 211 transmits the operation log of home appliance 21 to connection device 20. Communicator 211 may be connected to connection device 20 by wireless communication or by wired communication.

Controller 212 generates an operation log by associating (i) details information, such as details of operation made by the user received by input receiver 213, an operating state of operating unit 214, a detection result obtained by sensor 215, and information from an external device received by communicator 211, (ii) the home appliance model ID of home appliance 21, (iii) an individual number of home appliance 21, and (iv) the time when the details information was generated. Controller 212 stores the generated operation log in storage 216. The time when the details information was generated is, for example, the time when the details of operation were received, the time when the operating state changed, the time when the detection by sensor 215 was executed, the time when sensor 215 was caused to execute the detection, or the time when information from an external device was received. By controlling communicator 211, controller 212 transmits the operation log stored in storage 216 to connection device 20. Controller 212 may control the timing when the operation log stored in storage 216 is transmitted to connection device 20 by controlling communicator 211. By controlling communicator 211, controller 212 may collectively transmit a plurality of operation logs stored in storage 216 to connection device 20. The timing when the operation log is transmitted may be every predetermined period, at a predetermined time, or at a time satisfying a predetermined condition. Controller 212 also controls the operation of operating unit 214.

Input receiver 213 receives an input from the user. Input receiver 213 is, for example, a switch, and may receive an on/off input of the switch from the user. Input receiver 213 may be a receiver of a remote controller, and receive a user operation by receiving an operation signal emitted from the remote controller operated by the user. Input receiver 213 may also be a touch pad, a touch panel, a keyboard, a mouse, or the like.

Operating unit 214 achieves the functions of home appliance 21. When home appliance 21 is a liquid crystal TV, operating unit 214 is, for example, a backlight, a liquid crystal panel, or the like of the liquid crystal TV. When home appliance 21 is an air conditioner, operating unit 214 is a compressor, an expansion valve, a fan, or the like. When home appliance 21 is a lighting device, operating unit 214 is a light source. When home appliance 21 is a washing machine, operating unit 214 is a motor that rotates a drum, an electronic valve for water supply or drainage, or the like. When home appliance 21 is a refrigerator, operating unit 214 is a compressor, a fan, or the like. When home appliance 21 is a door phone, operating unit 214 is a loudspeaker, a microphone, a monitor, or the like.

Sensor 215 detects the state of home appliance 21. Sensor 215 is a temperature sensor, an illuminance sensor, a light detection sensor, or the like.

Storage 216 stores the operation log generated by controller 212. Storage 216 may store information necessary for the operation of home appliance 21, such as a program.

User Terminal 30

Figure 9:
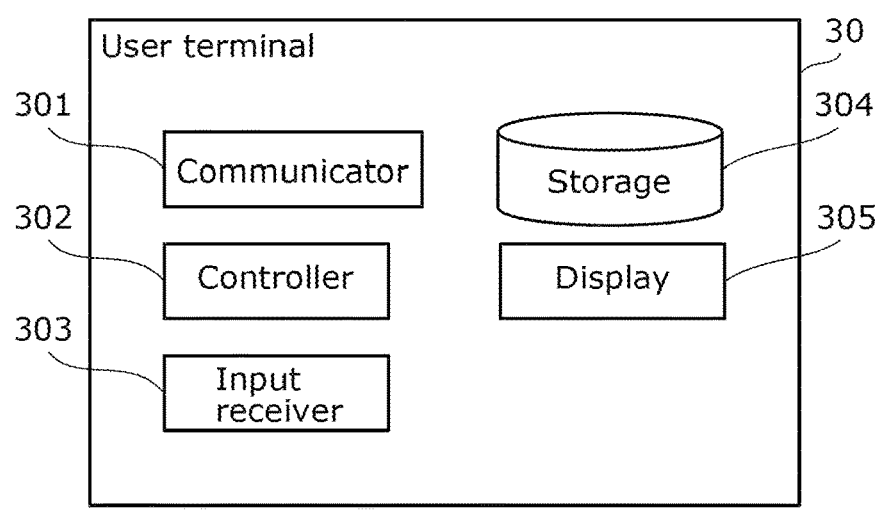
FIG. 9 illustrates an example of a configuration of a user terminal according to Embodiment 1.

FIG. 9 illustrates an example of a configuration of the user terminal according to Embodiment 1.

User terminal 30 transmits a usage request to management server 10, and obtains, from management server 10, an operation log that is in accordance with the usage request or analytical data of the operation log. User terminal 30 may generate analytical data from the operation log, and display the generated analytical data on display 305 of user terminal 30. When obtaining the analytical data from management server 10, user terminal 30 may display the obtained analytical data on display unit 305 of user terminal 30. User terminal 30 is, for example, a computer such as a smartphone, a tablet terminal, or a personal computer. User terminal 30 includes communicator 301, controller 302, input receiver 303, storage 304, and display 305. User terminal 30 may notify the user of the obtainment of the analytical data when the analytical data is obtained. User terminal 30 may include, for example, a voice function, a vibration function, and a light emitting function. User terminal 30 may use at least one of these functions to notify the user of the obtainment of the analytical data. User terminal 30 can be realized by a processor executing a predetermined program using a memory. Hereinafter, each structural element will be described.

Communicator 301 performs communication with management server 10 via network N. With this, controller 301 transmits a usage request to management server 10. Communicator 301 receives, from management server 10, the operation log that is in accordance with the usage request or the analytical data of the operation log.

Controller 302 generates a usage request in response to the input received by input receiver 303. After generating the usage request, controller 302 causes communicator 301 to transmit the generated usage request to management server 10. Controller 302 may generate analytical data in accordance with the operation log received by communicator 301. Controller 302 may also display the analytical data received by communicator 301 on display 305.

Here, the usage request will be described with reference to FIG. 10.

FIG. 10 illustrates an example of a data format of each usage request according to Embodiment 1.

Each row in the table illustrated in FIG. 10 indicates one usage request. Each usage request in FIG. 10 includes a user ID, a time of application, and details of usage application.

The user ID is user identification information which identifies the user of user terminal 30. The time of application is the time when the usage request was generated. The details of usage application indicates a condition for extracting one or more operation logs requested by the data user from among a plurality of operation logs stored in management server 10. The details of usage application indicates, for example, a condition for extracting the timer settings from among the operation logs generated by washing machines in 2020 in the case of the survey on timer settings of washing machines in 2020. Moreover, for example, in the case of the used detergent information after August 2020, the details of usage application indicates a condition for extracting the brand of the used detergent from among the operation logs generated by washing machines after August 2020. For example, in the case of the recording status at 23:00 on Nov. 3, 2020, the details of usage application indicates a condition for extracting the recording status from among the operation logs generated by recorders at 23:00 on Nov. 3, 2020. The recording status may include the recorded channel, the recorded program, and the like.

Input receiver 303 receives an input from the user. Input receiver 303 may be a touch pad, a touch panel, a keyboard, a mouse, or the like.

Storage 304 stores the operation log or analytical data received by communicator 301. Communicator 301 may store information necessary for the operation of user terminal 30, such as a program.

Display 305 is, for example, a display that displays analytical data.

Figure 11:
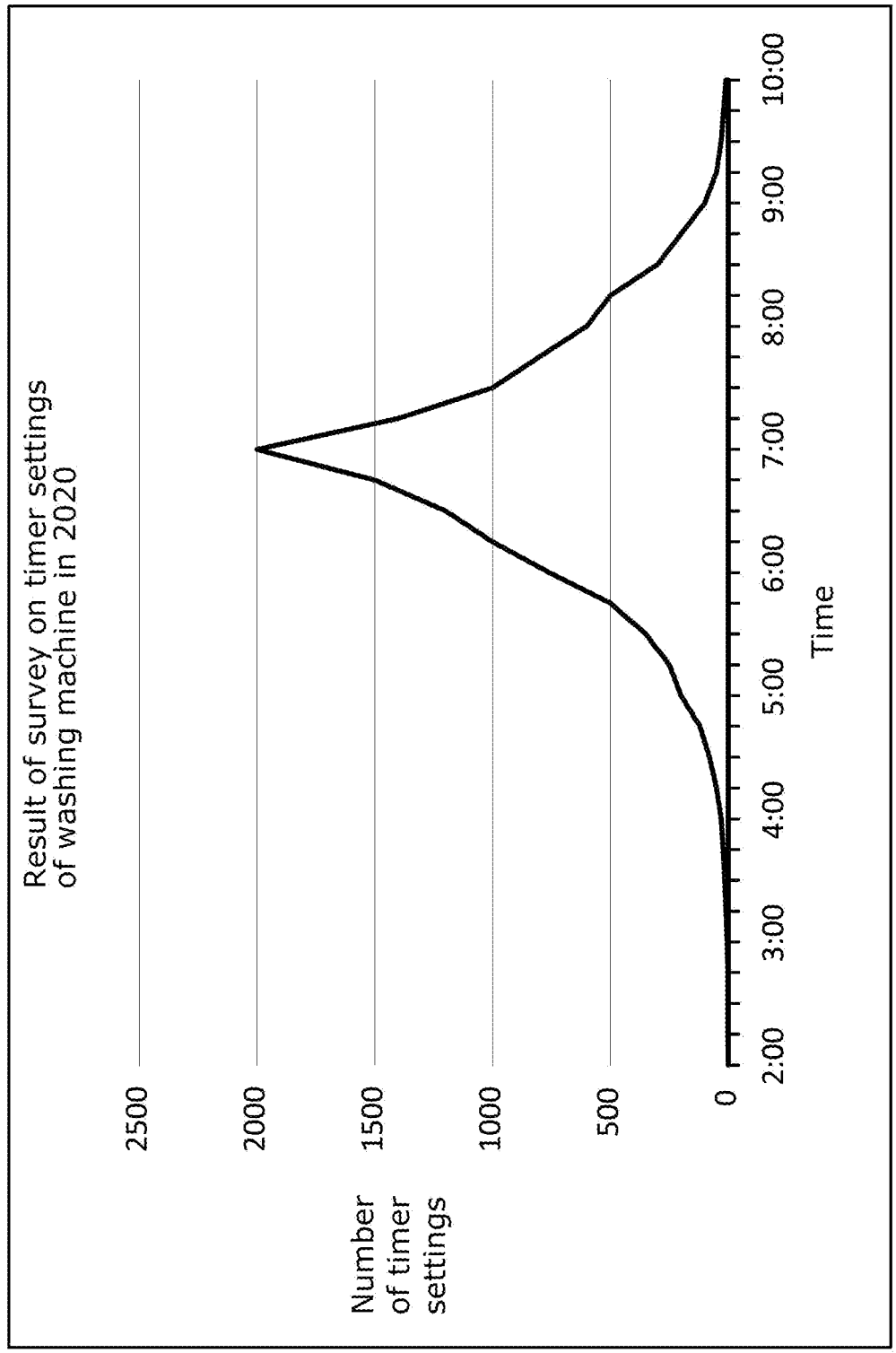
FIG. 11 illustrates a first example of analytical data displayed on the user terminal in the management system according to Embodiment 1.
Figure 12:
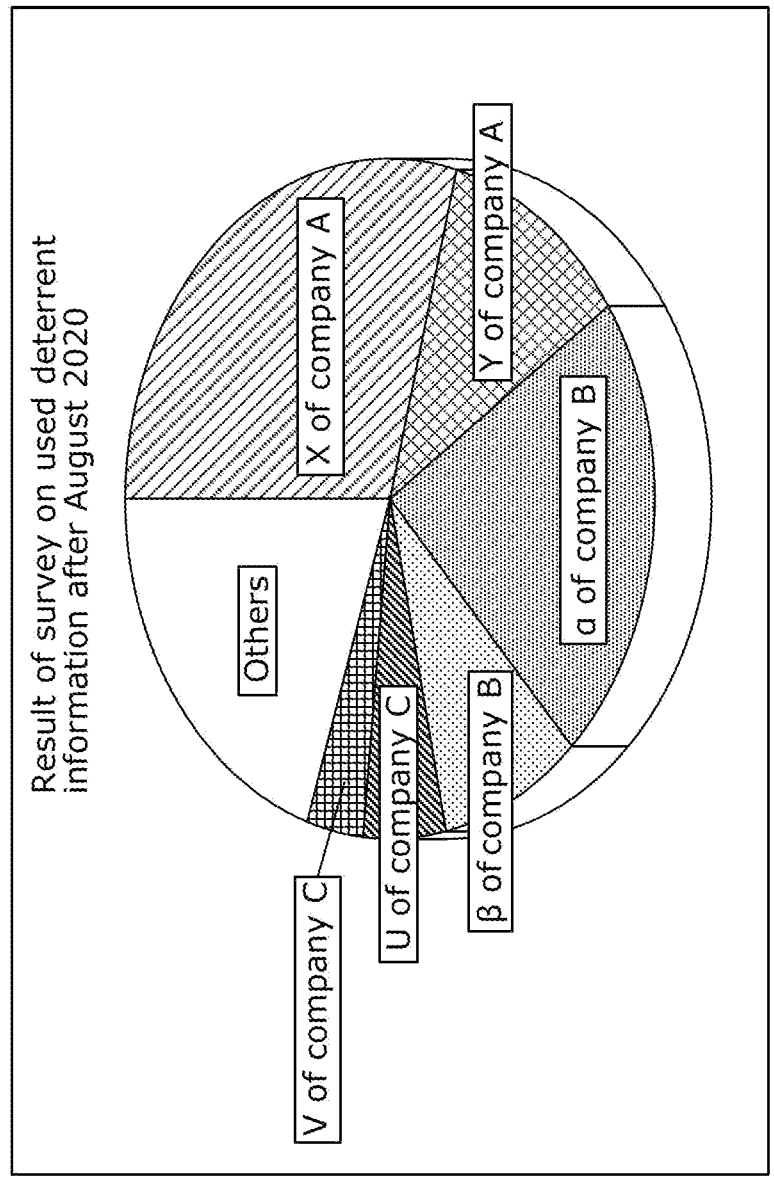
FIG. 12 illustrates a second example of the analytical data displayed on the user terminal in the management system according to Embodiment 1.
Figure 13:
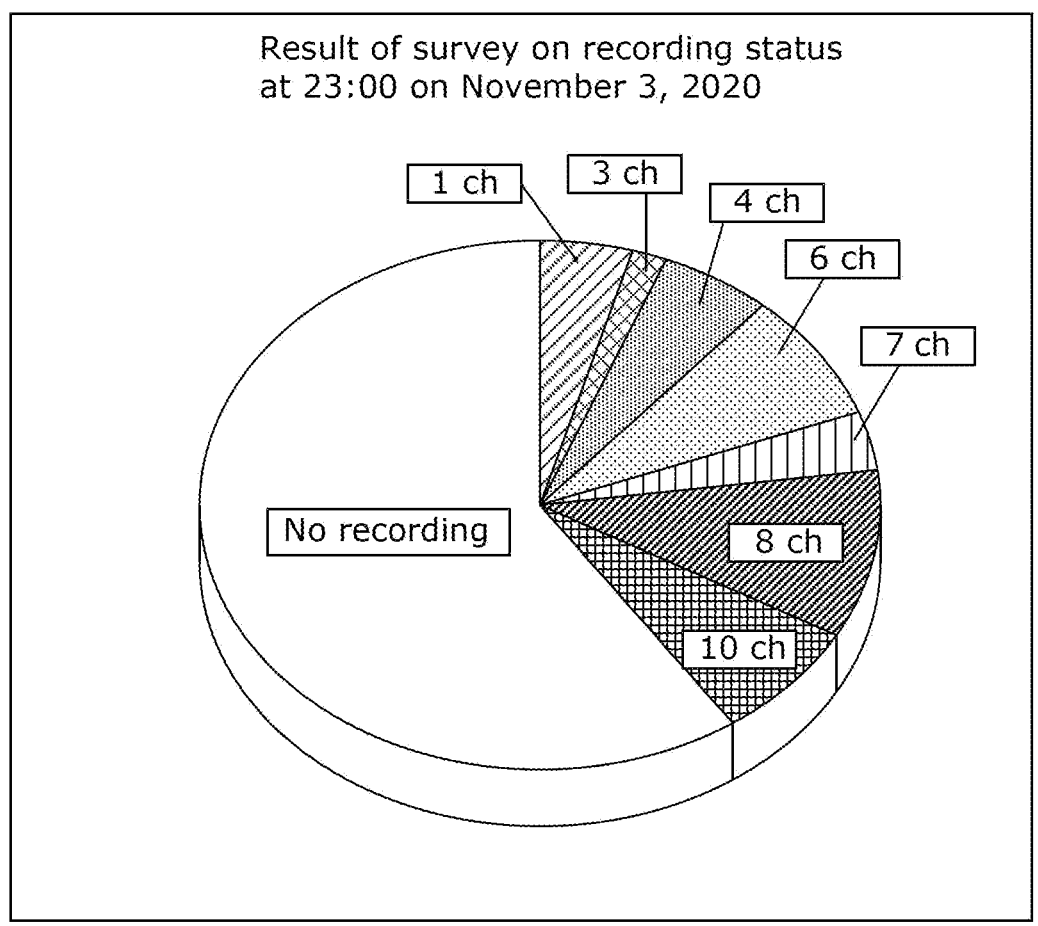
FIG. 13 illustrates a third example of the analytical data displayed on the user terminal in the management system according to Embodiment 1.

Next, the analytical data will be described with reference to FIG. 11 to FIG. 13. FIG. 11 illustrates a first example of the displayed analytical data. FIG. 12 illustrates a second example of the displayed analytical data. FIG. 13 illustrates a third example of the displayed analytical data.

FIG. 11 illustrates analytical data of operation logs extracted under the condition for extracting the timer settings from among the operation logs generated by washing machines in 2020. In this case, the analytical data is illustrated in a histogram where the horizontal axis indicates the time set by the timer settings, and the vertical axis indicates the number of times timer settings were set.

FIG. 12 illustrates analytical data of operation logs extracted under the condition for extracting the brands of the used detergents from among the operation logs generated by washing machines after August 2020. In this case, the analytical data is illustrated in a pie chart, indicating the usage rate of each detergent brand. Detergent brands include detergent manufacturers.

FIG. 13 illustrates analytical data of operation logs extracted under the condition for extracting the recording status from among the operation logs generated by recorders at 23:00 on Nov. 3, 2020. In this case, the analytical data is illustrated in a pie chart, indicating the recording rate for each channel of recorders.

Operation and the Like of Management System

Next, an operation of the management system configured as described above will be described.

Figure 14:
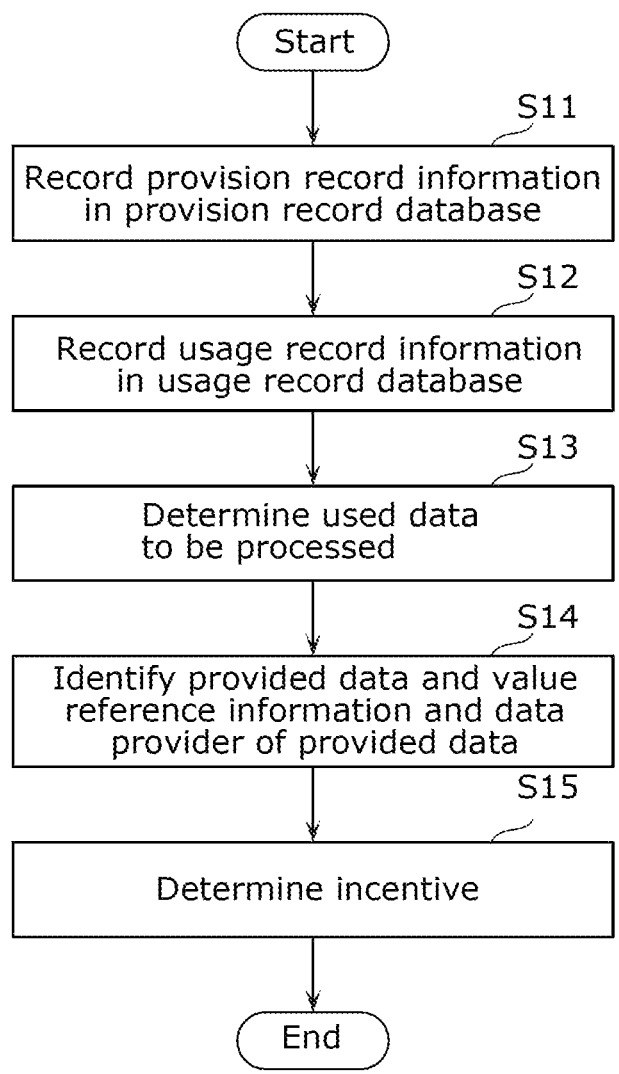
FIG. 14 is a flowchart illustrating an incentive determination process performed by the management system according to Embodiment 1.

FIG. 14 is a flowchart illustrating an incentive determination process performed by the management system according to Embodiment 1.

First, management server 10 records, in provision record DB 106, provision record information in which provider identification information which identifies the data provider, data identification information which identifies each of one or more operation logs, and value reference information which serves as a reference for calculating the data value of each of the one or more operation logs are associated with one another (S11).

Next, management server 10 records, in usage record DB 107, usage record information including data identification information which identifies the used data that is data used by the data user among the one or more operation logs (S12).

Next, management server 10 determines the used data to be processed, based on usage record DB 107 (S13).

Next, management server 10 identifies the operation log associated with the data identification information that is identical to the data identification information of the determined used data to be processed in provision record DB 106, and identifies the value reference information and the data provider of the identified operation log (S14).

Next, management server 10 determines an incentive for the identified data provider based on the identified value reference information (S15).

Next, a specific example of an operation of the management system including the above-mentioned incentive determination process will be described.

Figure 15:
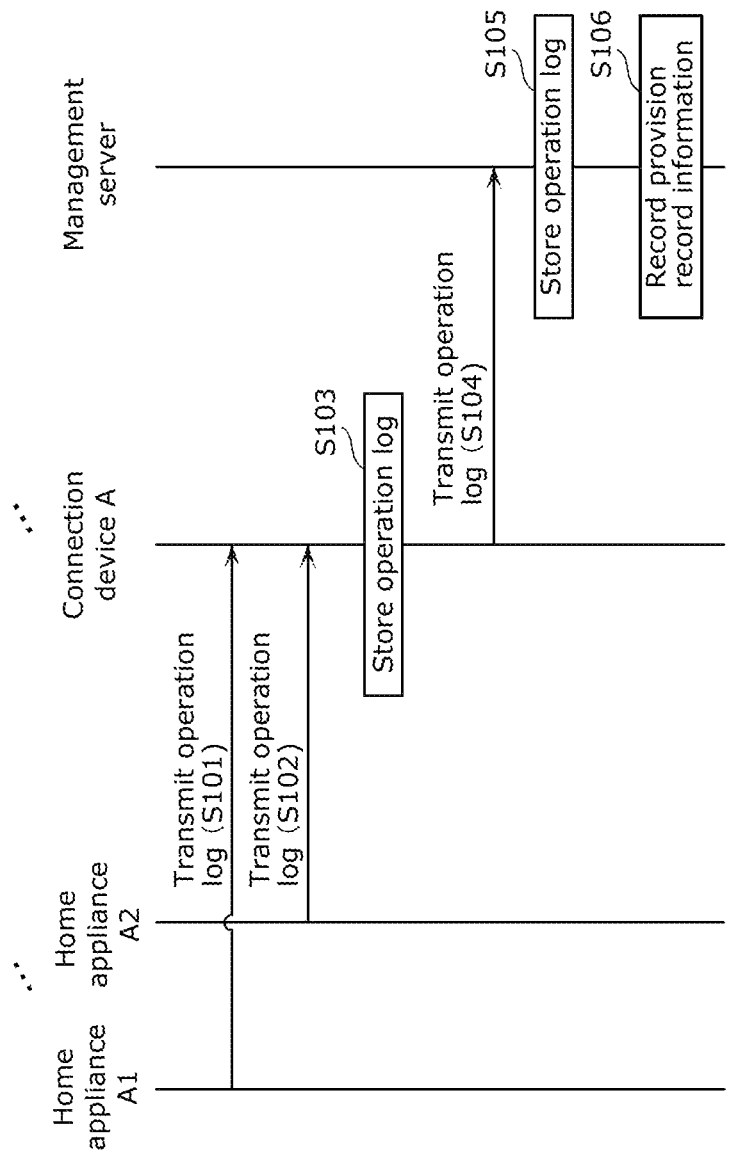
FIG. 15 is a sequence diagram illustrating an example of a process (S11) of recording the provision record information performed by the management system according to Embodiment 1.

FIG. 15 is a sequence diagram illustrating an example of a process (S11) of recording provision record information performed by the management system according to Embodiment 1.

FIG. 15 illustrates configurations of home appliances A1 and A2 and connection device A in house A among houses A to X, and illustration of the configurations of home appliances B1 to X1, B2 to X2 and connection devices B to X in the other houses B to X is omitted. In the process of recording provision record information, it is assumed that home appliances B1 to X1, B2 to X2 and connection devices B to X perform the same processes as home appliances A1, A2 and connection device A in house A.

Home appliance A1 transmits an operation log to connection device A at a predetermined timing (S101).

Home appliance A2 transmits an operation log to connection device A at a predetermined timing (S102). Steps S101 and S102 may be performed at the same timing or at different timings.

Connection device A stores the received operation log (S103). Connection device A, for example, accumulates operation logs received in a predetermined period.

Connection device A then transmits the stored operation log to management server 10 via network N at a predetermined timing (S104). Connection device A transmits, for example, one or more operation logs stored in a predetermined period to management server 10 via network N.

Management server 10 stores the received operation log (S105).

Management server 10 then generates provision record information in accordance with the received operation log, and records the provision record information in provision record DB 106 (S106).

Figure 16:
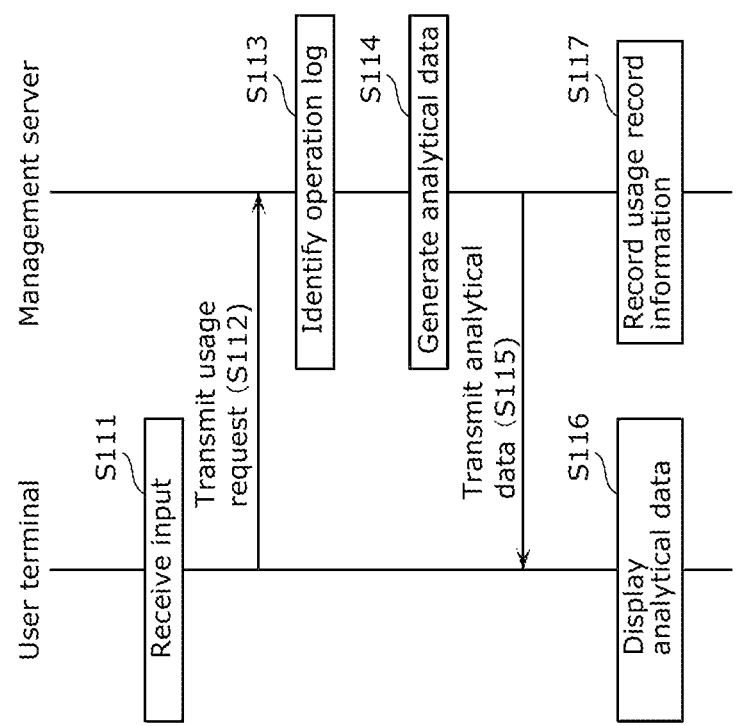
FIG. 16 is a sequence diagram illustrating an example of a process (S12) of recording the usage record information performed by the management system according to Embodiment 1.

FIG. 16 is a sequence diagram illustrating an example of a process (S12) of recording usage record information performed by the management system according to Embodiment 1.

User terminal 30 receives an input from the user, and generates an operation log usage request (S111).

Next, user terminal 30 transmits the generated usage request to management server 10 via network N (S112).

Upon receiving the usage request, management server 10 identifies one or more operation logs that are in accordance with the extraction condition included in the usage request (S113).

Next, management server 10 generates analytical data of the one or more identified operation logs (S114).

Next, management server 10 transmits the generated analytical data to user terminal 30 via network N (S115).

Next, user terminal 30 displays the received analytical data (S116).

Moreover, after step S115, management server 10 generates usage record information using the identified one or more operation logs, and records the generated usage record information in usage record DB 107 (S117).

In step S114, management server 10 may transmit one or more operation logs that are in accordance with the extraction condition. In this case, user terminal 30 may generate analytical data using the one or more operation logs and display the generated analytical data.

Figure 17:
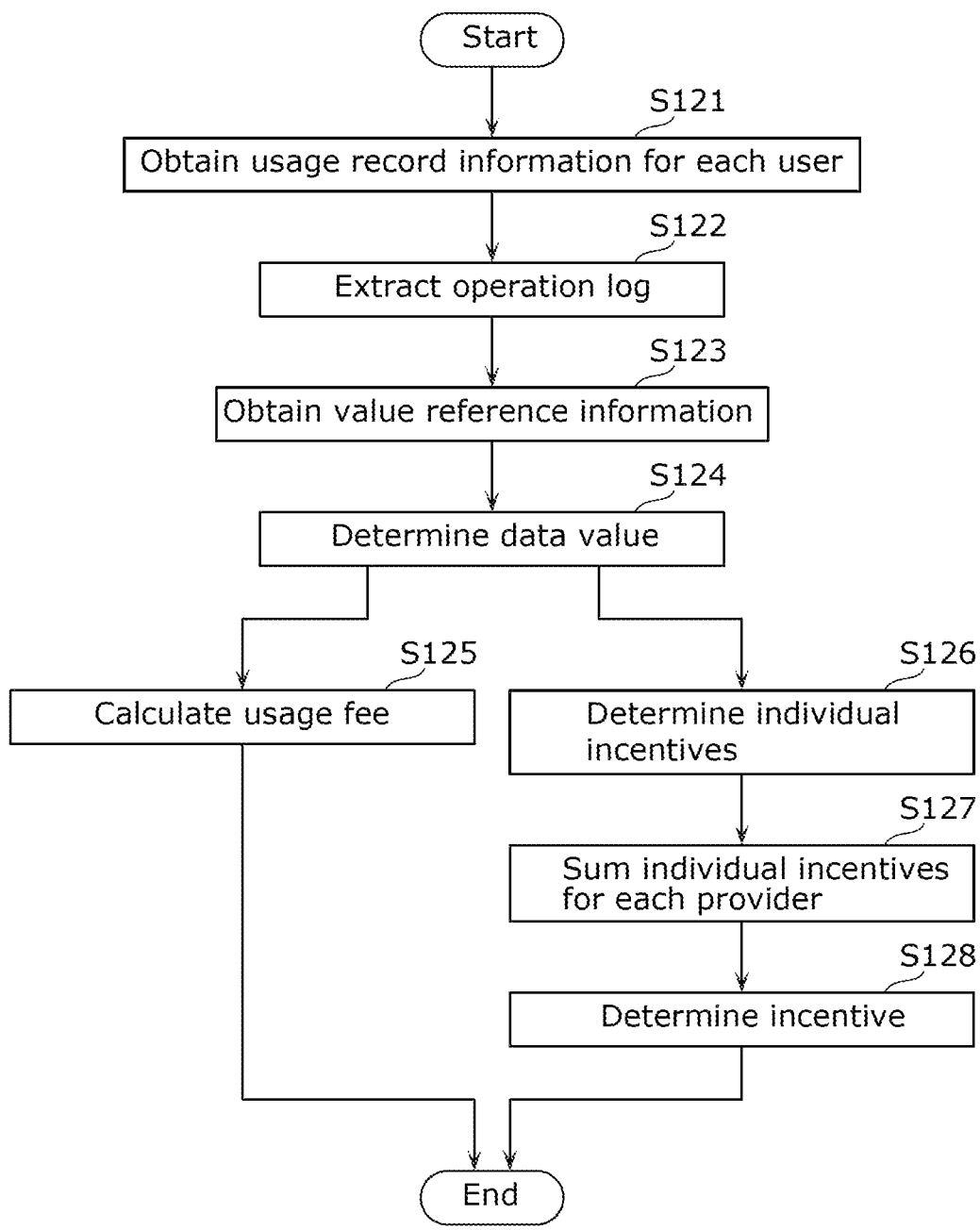
FIG. 17 is a flowchart illustrating an example of a usage fee and incentive calculation process according to Embodiment 1.

FIG. 17 is a flowchart illustrating an example of a process of calculating a usage fee and an incentive according to Embodiment 1.

Management server 10 obtains one or more items of usage record information for each user from usage record DB 107 (S121). For example, as illustrated in FIG. 6, a plurality of items of usage record information with user ID A2356 are obtained.

Next, management server 10 extracts one or more operation logs from the one or more items of usage record information obtained for each user (S122).

Next, management server 10 obtains, from provision record DB 106, the value reference information associated with the home appliance usage history ID that is identical to the home appliance usage history ID which is the data identification information of the extracted one or more operation logs (S123).

Next, management server 10 determines the data value based on the obtained value reference information (S124). Management server 10 determines the data value of each of the one or more operation logs obtained. Next, management server 10 calculates the usage fee for each user by summing the data values of the one or more operation logs extracted from the one or more items of usage record information for each user, based on the determined data value (S125).

On the other hand, management server 10 determines an individual incentive, which is an incentive for each of the one or more operation logs, based on the data value of each of the one or more operation logs (S126). In other words, management server 10 determines one or more individual incentives corresponding to the one or more operation logs.

Next, management server 10 sums one or more individual incentives for each provider (S127).

Next, management server 10 determines the individual incentives summed for each predetermined period and for each provider as the incentive for each provider (S128).

Figure 18:
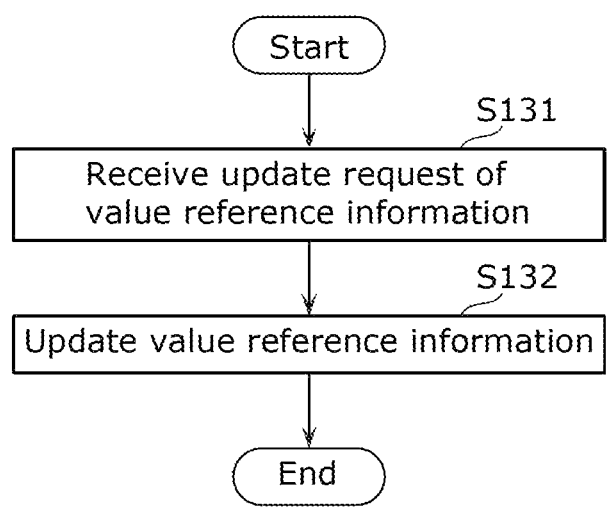
FIG. 18 is a flowchart illustrating an example of a process of updating value reference information according to Embodiment 1.

FIG. 18 is a flowchart illustrating an example of a process of updating value reference information according to Embodiment 1.

Management server 10 receives an update request of value reference information from an external device (S131).

Next, management server 10 updates the value reference information to the latest information (S132). Management server 10 may update the value reference information to the latest information in accordance with the update request. For example, the update request may include the latest value reference information. The latest value reference information may be determined by a person, or may be calculated by a computer using a predetermined algorithm. Management server 10 may hold a predetermined algorithm for calculating the latest value reference information.

Advantageous Effects and the Like

With the management system according to the present embodiment, an incentive for the provider of an operation log used by the user is determined based on the index value determined by each of the plurality of value indexes associated with the operation log, in accordance with the operation log used by the user. As described above, since the index value determined by each of the value indexes is associated with the operation log, the data value of the operation log can be determined in advance by the value indexes. In addition, since the index value determined by each of the value indexes is associated with the operation log, even if a large value is calculated for the index value of one value index and a biased evaluation is made, the bias can be reduced, and the data value of the operation log can be determined to an appropriate value. Accordingly, the incentive for the data provider can be appropriately determined, and the provider can be prompted to provide operation logs. Accordingly, data can be efficiently collected.

Embodiment 2

Figure 19:
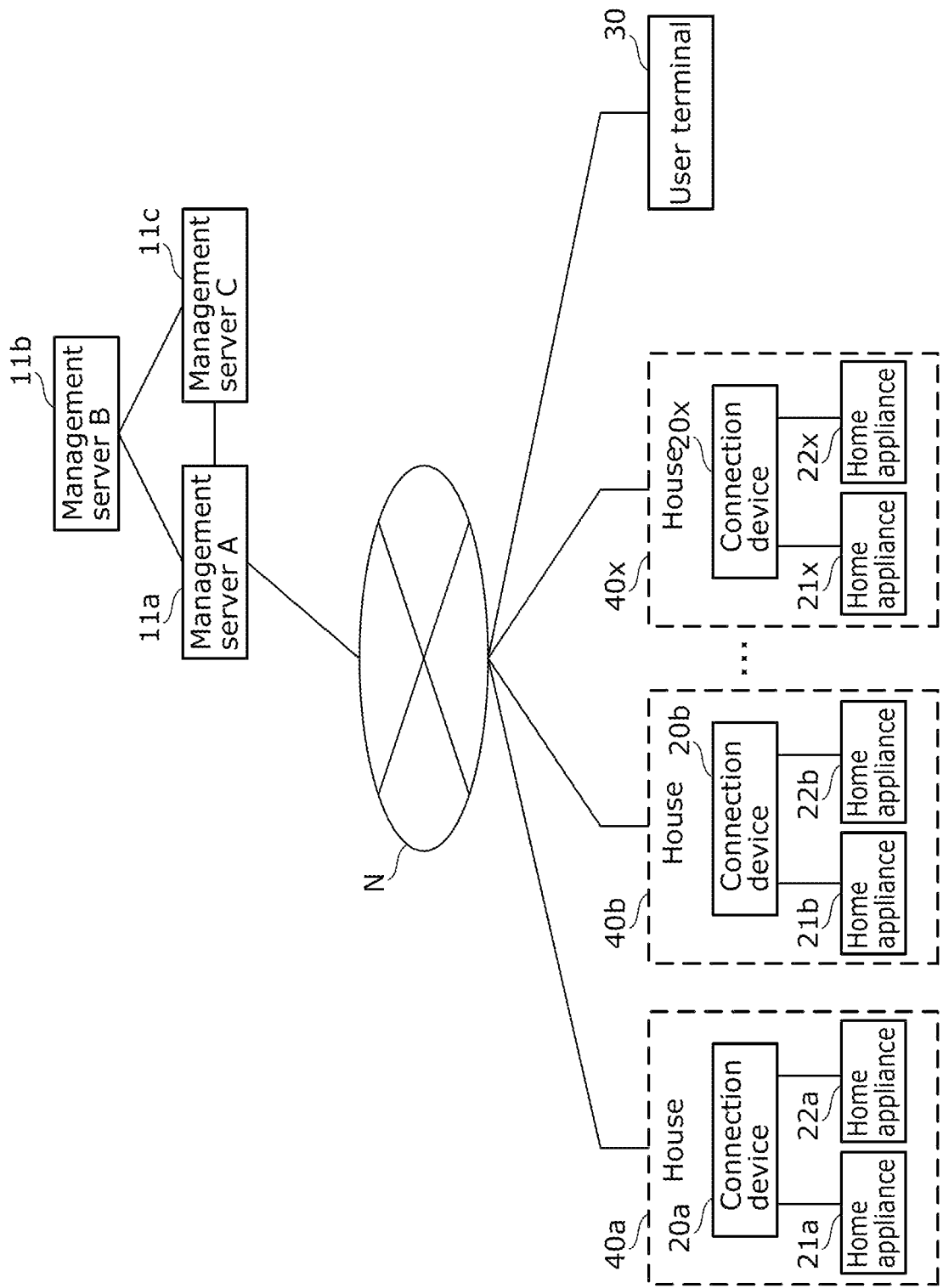
FIG. 19 illustrates an example of a configuration of a management system according to Embodiment 2.

FIG. 19 is a diagram illustrating an example of a configuration of a management system according to Embodiment 2.

As illustrated in FIG. 19, the management system according to Embodiment 2 is different from the management system according to Embodiment 1 in that the management system according to Embodiment 2 includes a plurality of management servers 11*a* to 11*c*.

In the following description, each of management server 11*a* to management server 11*c* is also referred to as management server 11, but management server 11*a* to management server 11*c* may be referred to as management server A to management server C.

Management Server 11

Figure 20:
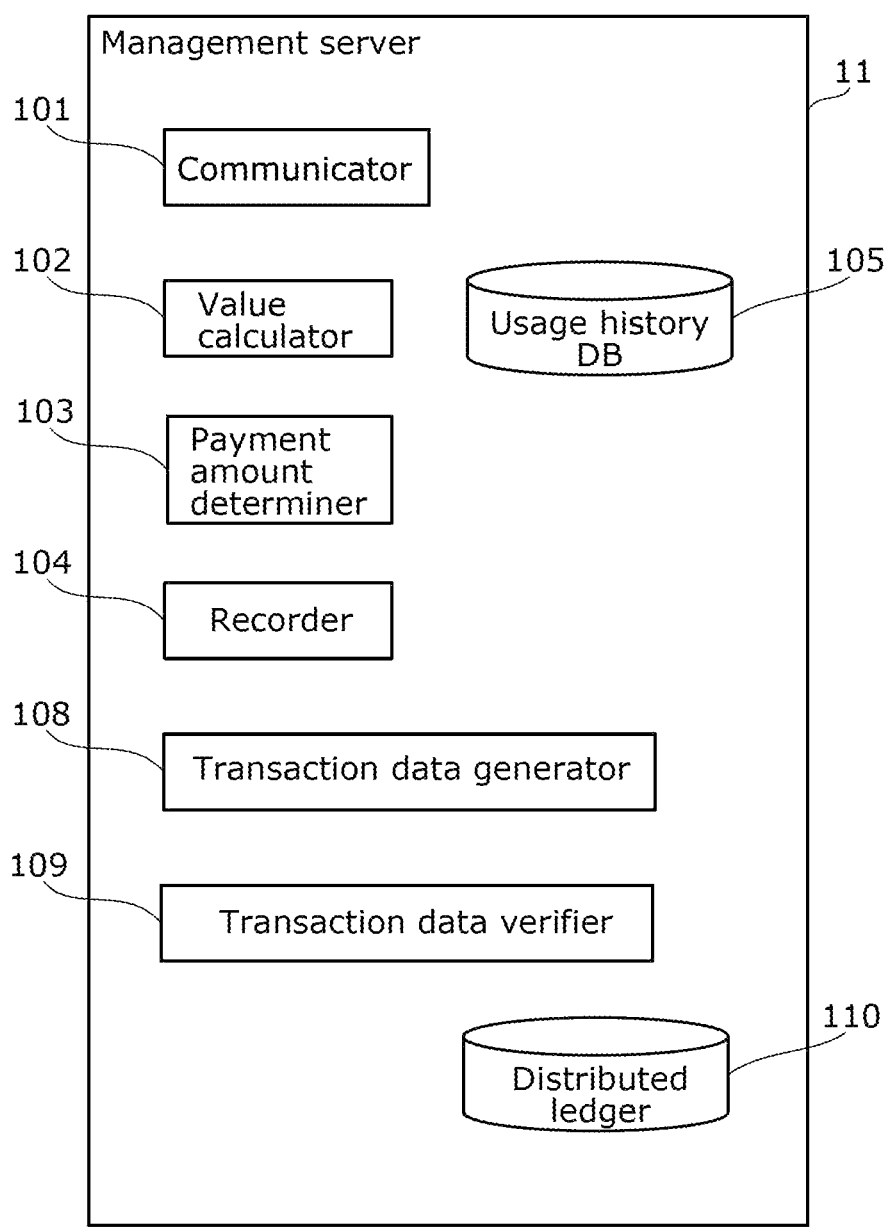
FIG. 20 illustrates an example of a configuration of management server 11 according to Embodiment 2.

FIG. 20 illustrates an example of a configuration of management server 11 according to Embodiment 2. The same structural elements as those in FIG. 2 are designated by the same reference numerals, and the detailed description thereof will be omitted.

Management server 11 illustrated in FIG. 20 is an example of one server (computer) among a plurality of servers each including a distributed ledger. As illustrated in FIG. 20, management server 11 includes communicator 101, value calculator 102, payment amount determiner 103, recorder 104, usage history DB 105, transaction data generator 108, transaction data verifier 109, and distributed ledger 110. Management server 11 may be implemented by a processor executing a predetermined program using a memory. The distributed ledger is, for example, a blockchain. While a blockchain is described as an example of the distributed ledger, distributed ledgers of other types (such as IOTA or hashflags) may also be used. Hereinafter, each structural element will be described.

Transaction data generator 108 generates first transaction data. In the present embodiment, transaction data generator 108 generates the first transaction data including the provision record information generated by recorder 104.

Transaction data generator 108 also generates second transaction data. In the present embodiment, transaction data generator 108 generates the second transaction data including the usage record information generated by recorder 104.

Transaction data generator 108 transmits the generated first transaction data to other management servers 11 via communicator 101. Transaction data generator 108 also transmits the generated second transaction data to other management servers 11 via communicator 101.

When communicator 101 receives the transaction data, transaction data verifier 109 verifies the validity of the transaction data. For example, transaction data verifier 109 verifies whether or not the transaction data received by communicator 101 includes an electronic signature generated by a proper method. Note that this verification may be skipped. Here, the transaction data received by communicator 101 is either the first transaction data or the second transaction data.

In addition, transaction data verifier 109 executes a consensus algorithm for achieving agreement on the validity of transaction data together with a plurality of other management servers 11. The consensus algorithm does not have to be executed.

Here, practical byzantine fault tolerance (PBFT) may be used as the consensus algorithm, or other known consensus algorithms may be used. Examples of the known consensus algorithms include Proof of Work (PoW) and Proof of Stake (PoS). When PBFT is used for the consensus algorithm, transaction data verifier 109 receives, from each of the plurality of other management servers 11, a report indicating whether or not the transaction data has been successfully verified, and determines whether or not the number of such reports exceeds a predetermined number. When the number of the reports exceeds the predetermined number, transaction data verifier 109 may determine that the validity of the transaction data has been verified by the consensus algorithm.

When transaction data verifier 109 confirms the validity of the transaction data, transaction data verifier 109 causes recorder 104 to record the transaction data. Since only the transaction data whose validity has been successfully verified is recorded in recorder 104, unnecessary consumption of the memory capacity can be reduced.

In the present embodiment, transaction data verifier 109 verifies the validity of the first transaction data and the second transaction data received by communicator 101.

Recorder 104 records the transaction data by including, in a block, the transaction data whose validation has been verified by transaction data verifier 109 and storing the block in distributed ledger 110.

In other words, in the present embodiment, in the recording of the provision record information in the provision record DB, management server 11 records the provision record information in the provision record DB by transferring the first transaction data including the provision record information to other management servers 11, and storing a first block including the first transaction data in distributed ledger 110 managed by management server 11. Moreover, in the recording of the usage record information in the usage record DB, management server 11 records the usage record information in the usage record DB by transferring the second transaction data including the usage record information to another management server 11, and storing a second block including the second transaction data in distributed ledger 110 managed by management server 11. In such a manner, provision record DB and usage record DB may be stored in distributed ledger 110.

Recorder 104 may internally include distributed ledger 110.

Distributed ledger 110 stores the first transaction data and the second transaction data. Moreover, distributed ledger 110 stores a contract code for executing the usage fee and incentive calculation process described with reference to FIG. 17.

Operation and the Like of Management System

Next, an operation of the management system configured as described above will be described.

Figure 21:
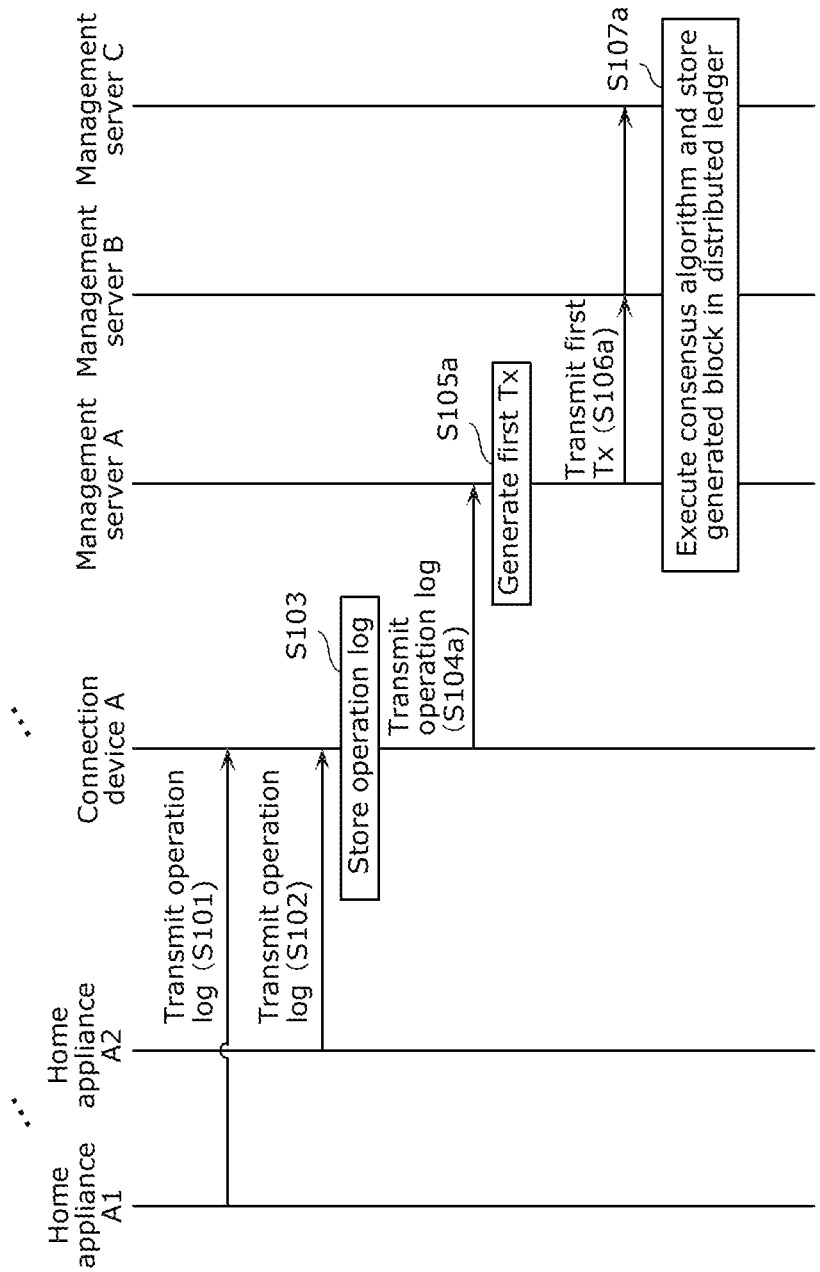
FIG. 21 is a sequence diagram illustrating an example of a process (S11) of recording provision record information performed by the management system according to Embodiment 2.

FIG. 21 is a sequence diagram illustrating an example of the process (S11) of recording the provision record information performed by the management system according to Embodiment 2. The same configurations as those in FIG. 15 are designated by the same reference numerals, and detailed description thereof will be omitted.

In a similar manner to FIG. 15, FIG. 21 illustrates an example of the configurations of home appliances A1 and A2 and connection device A in house A among houses A to X. Illustration of the configurations of home appliances B1 to X1 and B2 to X2 and connection devices B to X in the other houses B to X is omitted. In the process of recording the provision record information, it is assumed that home appliances B1 to X1 and B2 to X2 and connection devices B to X perform the same processes as home appliances A1, A2 and connection device A in house A.

After step S103, connection device A transmits the stored operation log to management server A via network N at a predetermined timing (S104a). Connection device A transmits, for example, one or more operation logs stored in a predetermined period to management server A via network N.

Management server A generates first transaction data including the received operation log (S105a). In FIG. 21, the first transaction data is referred to as first Tx.

Next, management server A transmits the generated first transaction data to other management servers B and C (S106a).

Next, each of management servers A to C executes the consensus algorithm, generate a block including the first transaction data, and stores the generated block in distributed ledger 110 (S107a). With this, the provision record information included in the first transaction data is stored in the provision record DB.

The first transaction data may be generated by connection device A. In this case, connection device A transmits the first transaction data to management server A, and management server A transfers the received first transaction data to the other management servers B and C. With this, step S107a may be started.

Figure 22:
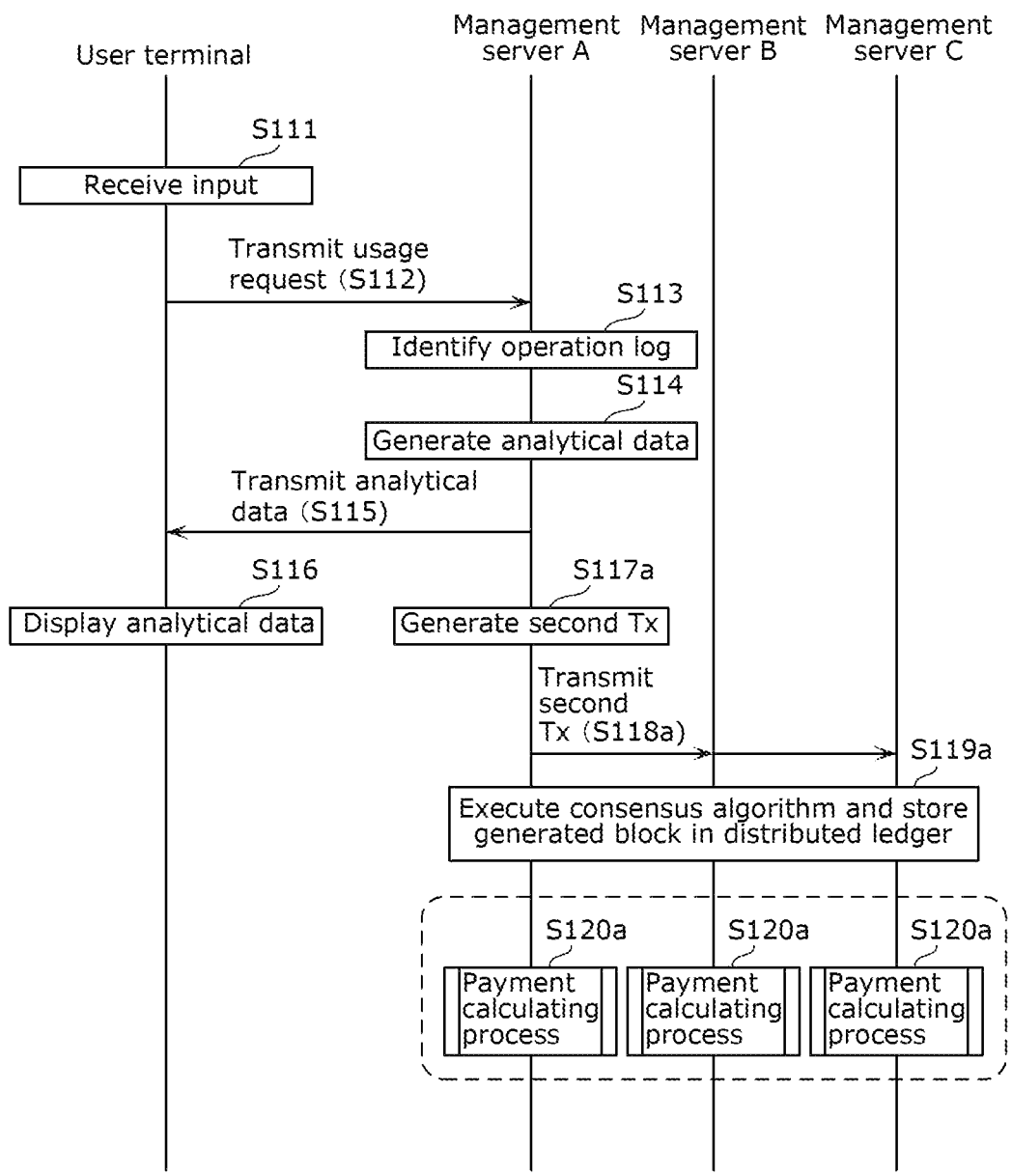
FIG. 22 is a sequence diagram illustrating an example of a process (S12) of recording usage record information performed by the management system according to Embodiment 2.

FIG. 22 is a sequence diagram illustrating an example of a process (S12) of recording the usage record information performed by the management system. The same processes as those in FIG. 16 are designated by the same reference numerals, and detailed description thereof will be omitted.

After step S114, management server A generates usage record information using the identified one or more operation logs, and generates second transaction data including the generated usage record information (S117a). In FIG. 22, the second transaction data is referred to as second Tx.

Next, management server A transmits the generated second transaction data to the other management servers B and C (S118a).

Next, each of management servers A to C executes a consensus algorithm, generates a block including the second transaction data, and stores the generated block in distributed ledger 110 (S119a). With this, the usage record information included in the second transaction data is stored in the usage record DB.

Next, when the consensus algorithm is executed for the second transaction data, each of management servers A to C executes the process of calculating the usage fee and incentive by a smart contract (S120a). Since the process of calculating the usage fee and incentive is the same as the process described with reference to FIG. 17, detailed description thereof will be omitted. In FIG. 22, the process of step S120a is referred to as a payment calculating process.

As described, each of distributed ledgers 110 owned by management servers A to C includes a contract code for executing the identification of the value reference information and the data provider and the determination of the incentive based on the second transaction data. When management servers A to C obtain the second transaction data in the identification of the value reference information and the data provider and the determination of the incentive, management servers A to C execute the contract code included in distributed ledger 110 of management server A to execute the identification of the value reference information and the data provider, and the determination of the incentive.

Advantageous Effects and the Like

With the management system according to the present embodiment, the provision record information and usage record information can be stored in the distributed ledger, and the provision record information and usage record information that are difficult to be tampered with can be used for determining an incentive for the provider. Accordingly, the incentive for the provider can be determined more appropriately.

Variations

In the management system according to the above embodiment, each operation log of a home appliance is given as a specific example of the provided data, but the provided data is not limited to the operation log of the home appliance. The provided data may be, for example, an operation log of a self-driving vehicle, or an operation log of equipment provided in a facility such as a factory. The provided data may be a measured value of a power meter, a gas meter, or a water meter provided in a house.

The function of recording the operation logs in usage history DB 105, the function of recording the provision record information in provision record DB 106, and the function of recording the usage record information in usage record DB 107 in management server 10 according to the above embodiment may be realized as a device different from management server 10. For example, these devices are communicably connected to management server 10.

In the management system according to the above embodiment, the data value may change due to the following factors. For example, the data value may change according to the reliability of the home appliance that generated the operation log. The reliability of the home appliance may be determined by, for example, the OS type, the OS update record, the external operation history, the external communication record, or the application installation record. The OS update record, external operation history, external communication record, application installation record, and the like may be written and managed in the databases included in management servers 10 and 11. The reliability of the home appliance may be determined using a reliability evaluation table in which the reliability is associated with each of the above-mentioned records. The reliability of the home appliance may be evaluated by a combination of a plurality of records. The reliability of each operation log may be determined based on the reliability of the home appliance. Moreover, management servers 10 and 11 may calculate the data value with reliability by multiplying the data value by the determined reliability, and determine the usage fee or incentive based on the data value with reliability.

In addition, the calculation of the data value may be performed based on other factors. For example, when a specific request such as "this kind of data is requested" is received from user terminal 30, the data value may be calculated such that the data value increases with an increase in the number of requests for the operation log. The request information indicating the request may be recorded in the databases included in management servers 10 and 11. Moreover, usage history DB 105 may additionally include information indicating the presence or absence of a request, and the information may be associated with the operation log.

In the management system according to the above embodiment, the data value changes according to the type of the operation log, the model of the home appliance that generated the operation log, seasonal changes and the like, but the data value is not limited to such examples.

The data value may be determined by, for example, data relating to the family structure of the house of the provider (hereinafter, referred to as "usage family attribute data"). The usage family attribute data includes personal data such as age, gender, height, weight, occupation, place to commute, and amount of income, which are the attributes of the family whose data is used. In this case, the usage family attribute data may be recorded in the usage family attribute database included in management servers 10 and 11 as a set of the home ID and the usage family attribute data.

Moreover, the data value may change according to the operation log relating to the family with a designated family attribute. In this case, a column called "family attribute evaluation" may be included and managed in the home appliance usage history database.

In addition, when a specific request such as "data relating to families with this kind of family attribute is requested" is received from user terminal 30, the data value may be calculated such that the value of the operation log generated from the house of the family with the family attribute for which a larger number of requests have been made is higher than the value of the operation log generated from the house of the family with the family attribute for which a smaller number of requests have been made. The request information indicating the request may be recorded in the database included in management servers 10 and 11. Usage history DB 105 may additionally include information indicating the presence or absence of a request for family attribute, and the presence or absence of the request may be recorded in association with the operation log.

The data value may be determined by the number of transactions. The data value may be calculated such that the value of the operation log for which a larger number of requests have been made from user terminal 30 is higher than the value of the operation log for which a smaller number of requests have been made from user terminal 30. The number of transactions may be recorded in a distributed ledger using a blockchain, so that the user is able to refer to the information using user terminal 30 while preventing falsification.

The operation log stored in usage history DB 105 may be provided to user terminal 30 when the number of times user terminal 30 made the request exceeds a predetermined threshold value. As a result, only the operation log with a high data value will be provided. The process of providing the operation log stored in usage history DB 105 after the number of times the request was made for the operation log exceeds the threshold value may be realized by a smart contract on a blockchain.

Moreover, the value of the operation logs for which a large number of requests have been made by user terminal 30 may be set to a high value when a new operation log is added. When a plurality of user terminals 30 make requests for given operation logs, the operation logs may be provided only to user terminal 30 which sets a high evaluation to the value of the operation logs (auction format).

In the management system according to Embodiment 2, it has been described that the provision record information and the usage record information are recorded and managed in the distributed ledger. However, the present disclosure is not limited to such an example, and the data value calculated by value calculator 102 may be recorded and managed in the distributed ledger.

The usage fee and the incentive determined by payment amount determiner 103 may be recorded in the centralized database provided in management server 10, or recorded in a distributed ledger which is provided in management servers 11a to 11c and which uses a blockchain.

In addition, the transaction of collecting the usage fee from the user or paying the incentive to the provider may be performed using a cryptocurrency using a blockchain.

The devices forming the blockchain may include all or part of connection device 20 and user terminal 30 in addition to management servers 11a to 11c.

Moreover, recording in the usage history DB may be performed by storing a block including transaction data including the operation logs in the distributed ledger.

When any one of the usage history DB, the provision record DB, and the usage record DB is recorded in a distributed ledger using a blockchain, only the hash value of each operation log may be recorded without recording the operation log itself. In other words, the provision record information stored in the provision record DB may include the hash value of each operation log, and does not have to include the operation log itself. Moreover, it may be that management server 11 converts the operation log with a level of privacy that is greater than a predetermined threshold value (for example, 1) into a hash value, and record provision record information including only the hash value of the operation log in the distributed ledger as the provision record information of the operation log. With this, the privacy of the user can be protected in management server 11 including the distributed ledger.

In the management system according to the above embodiment, the operation logs are transmitted from home appliances 21 and 22 provided in each house 40 to management servers 10 and 11 via connection device 20. In other words, the provider of the operation logs is assumed to be the owner of each house 40, but the present disclosure is not limited to such an example. For example, the provider of the operation logs may be the installer of connection device 20, or may be the owner of a rental house when house 40 is the rental house. In the case of a facility such as a factory, a company, or a warehouse instead of house 40, the provider of the operation logs may be a corporation or an organization that owns the facility such as a factory, a company, or a warehouse. In this case, the provider identification information may be an owner ID.

In the method according to the above embodiments, the information obtained, generated, and outputted by the management system may be stored in a distributed ledger.

Supplemental Remarks

The blockchain in the foregoing embodiments will be supplementarily described below.

Figure 23:
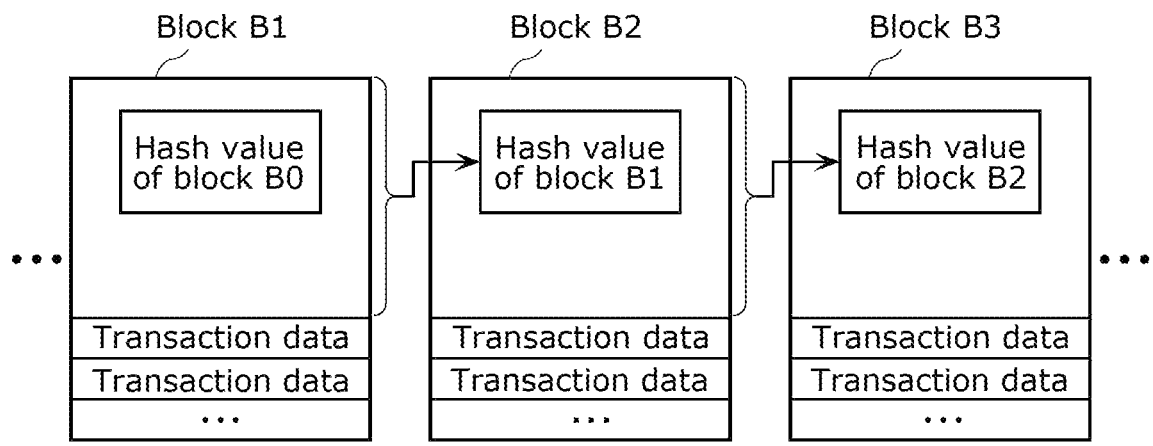
FIG. 23 is an explanatory diagram illustrating the data structure of a blockchain.

FIG. 23 is an explanatory diagram illustrating a data structure of a blockchain.

The blockchain is formed by connecting blocks as recording units in a chain. Each block has a plurality of items of transaction data and a hash value of the immediately previous block. Specifically, block B2 includes a hash value of block B1 preceding block B2. A hash value calculated from a plurality of items of transaction data and the hash value of block B1 included in block B2 is included in block B3 as a hash value of block B2. By connecting blocks in a chain where each block includes information of the previous block as a hash value in this way, tampering with recorded transaction data can be effectively prevented.

If past transaction data is changed, the hash value of the block will end up being different from the value before the change. To disguise the tampered block as proper, all subsequent blocks need to be recreated. Such operation is practically very difficult. This property is used to ensure the difficulty of tampering with blockchains.

Figure 24:
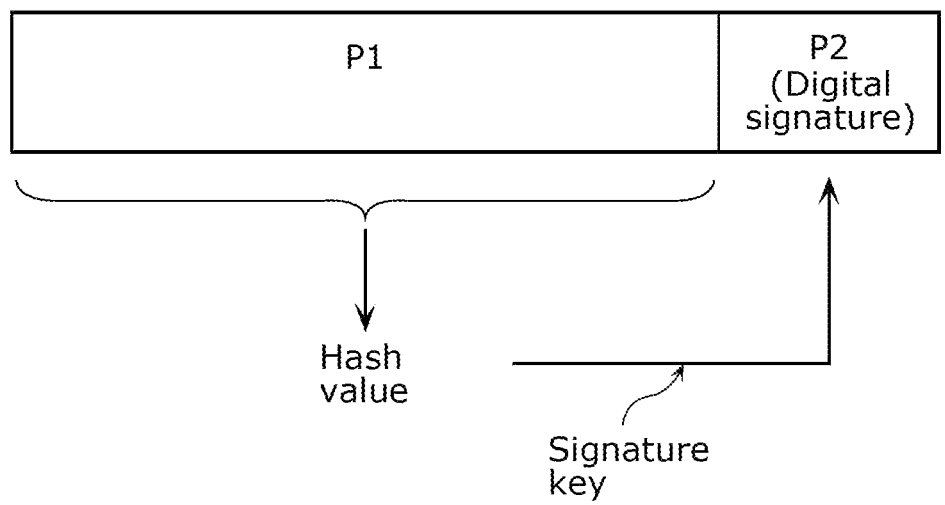
FIG. 24 is an explanatory diagram illustrating the data structure of transaction data.

FIG. 24 is an explanatory diagram illustrating a data structure of transaction data.

The transaction data illustrated in FIG. 24 includes transaction body P1 and digital signature P2. Transaction body P1 is a data body included in the transaction data. Digital signature P2 is generated by signing a hash value of transaction body P1 using a signature key of the generator of the transaction data, i.e. by encrypting the hash value using a private key of the generator. The digital signature may be implemented using Elliptic Curve Digital Signature Algorithm (ECDSA), CRYSTALS-Dilithium, Falcon, SPHINCS+ or the like.

Since the transaction data includes digital signature P2, tampering is substantially impossible. This is because if the transaction data is tampered with, verification using digital signature P2 fails, which reveals that the transaction data has been tampered with. Tampering with the transaction body P1 is thus prevented.

Other Embodiments and the Like

The present disclosure has been described based on the above embodiments. Of course, the present disclosure is not limited to the embodiments. The following cases are also included in the present disclosure.

(1) Each device in the embodiments described above is specifically a computer system including a microprocessor, a read only memory (ROM), a random access memory (RAM), a hard disk unit, a display unit, a keyboard, a mouse and the like. The RAM or the hard disk unit stores a computer program. Each device achieves its function by the microprocessor operating according to the computer program. Here, a computer program is formed of combinations of instruction codes indicating commands to a computer to achieve a predetermined function.

(2) Part or all of the structural elements included in each device in the embodiments described above may be configured by a single system large scale integration (LSI). The system LSI is an ultra-multifunctional LSI manufactured by integrating a plurality of structural elements on a single chip, and specifically, is a computer system including a microprocessor, a ROM, a RAM and the like. A computer program is stored in the RAM. The system LSI achieves its function by the microprocessor operating according to the computer program.

Moreover, each of the structural elements included in each of the above-described devices may be individually made into a single chip, or may be made into a single chip so as to include part or all of the structural element.

Although the term "system LSI" is used here, it may be called IC, LSI, super LSI, or ultra LSI depending on the degree of integration. The method of circuit integration is not limited to LSI, and may be realized by a dedicated circuit or a general-purpose processor. A field programmable gate array (FPGA) that can be programmed after the LSI is manufactured, or a reconfigurable processor that can reconfigure the connection and setting of circuit cells inside the LSI may be used.

Moreover, if an integrated circuit technology comes out to replace LSI as a result of the advancement of semiconductor technology or a derivative other technology, it is naturally also possible to carry out function block integration using such a technology. Adaption of biotechnology, for example, is a possibility.

(3) Part or all of the structural elements of each of the above devices may be configured with an integrated circuit (IC) card removable from each device or a single module. The IC card or the module is a computer system including a microprocessor, a ROM, a RAM, and the like. The IC card or the module may include the above-mentioned super-multifunctional LSI. The IC card or the module achieves its function by the microprocessor operating according to the computer program. The IC card or the module may be tamper resistant.

(4) The present disclosure may be implemented by the method described above. Moreover, the method may be a computer program implemented by a computer or a digital signal configured from the computer program.

Moreover, the present disclosure may be a computer program or a digital signal recorded on a computer-readable recording medium, such as a flexible disk, a hard disk, a compact disc (CD)-ROM, a MO, a DVD, a DVD-ROM, a DVD-RAM, a BD (Blu-ray (registered trademark) Disc), and a semiconductor memory. Moreover, it may be the digital signal recorded on these recording media.

Moreover, the present disclosure may transmit the computer program or digital signal via an electronic communication line, a wireless or wired communication line, a network represented by the Internet, a data broadcast, and the like.

Moreover, it may be that the present disclosure is implemented by a computer system including a microprocessor and a memory, the computer program is recorded in the memory, and the microprocessor operates according to the computer program.

Moreover, the program or the digital signal may be recorded on a recording medium and transferred, or the program or the digital signal may be transferred via the network or the like to be implemented by another independent computer system.

(5) The embodiments and the variations described above may be combined.

INDUSTRIAL APPLICABILITY

The present disclosure can be used for an incentive determination method, server, and recording medium, and is usable for an incentive determination method, server, and recording medium and the like which are capable of efficiently collecting data.

The invention claimed is:

1. A method comprising:
recording provision record information in which provider identification information, data identification information, and value reference information are associated with one another, the provider identification information identifying each of one or more data providers who provide data generated by one or more apparatuses, the data identification information identifying each of one or more items of provided data that are data provided by the one or more data providers, the value reference information serving as a reference for calculating a data value of each of the one or more items of provided data; and when the one or more items of provided data include used data that is data used by a data user, determining an incentive for a data provider of the used data among the one or more data providers based on the provision record information, wherein the value reference information includes an index value determined by each of a plurality of value indexes, and the determining includes:
- identifying, based on the provision record information, (i) provided data associated with data identification information that is identical to data identification information which identifies the used data, and (ii) value reference information of the provided data identified and a data provider of the provided data identified; and
- determining an incentive for the data provider identified, based on the value reference information identified.

2. The method according to claim 1, further comprising:
recording usage record information in a usage record database, the usage record information including data identification information which identifies the used data; and identifying a total number of uses of the provided data identified, based on the usage record database, wherein the determining includes determining an incentive for the data provider identified, based on the value reference information identified and the total number of uses identified.

3. The method according to claim 1,
wherein the plurality of value indexes in the value reference information include at least two of (i) a value index based on a type of the provided data, (ii) a value index based on a type of an apparatus that generated the provided data, or (iii) a value index based on a period when the provided data was generated by the apparatus.

4. The method according to claim 2, further comprising:
recording the provision record information in a provision record database, wherein in the recording of the provision record information in the provision record database, the provision record information is recorded in the provision record database by causing a computer to transfer first transaction data including the provision record information to an other computer, and to store a first block including the first transaction data in a distributed ledger managed by the computer, and in the recording of the usage record information in the usage record database, the usage record information is recorded in the usage record database by causing the computer to transfer second transaction data including the usage record information to the other computer, and to store a second block including the second transaction data in the distributed ledger managed by the computer.

5. The method according to claim 4,
wherein each of the distributed ledger held by the computer and a distributed ledger held by the other computer includes a contract code for executing, based on the second transaction data, the identifying of the value reference information and the data provider and the determining of the incentive, and in the identifying of the value reference information and the data provider and the determining of the incentive, the identifying of the value reference information and the data provider and the determining of the incentive are executed by executing the contract code included in the distributed ledger of the computer when the second transaction data is obtained.

6. The method according to claim 4,
wherein the provision record information further includes a hash value of the provided data.

7. The method according to claim 1,
wherein the determining of the incentive includes:
- calculating, for each of a plurality of items of the used data, a value of the used data based on (i) an index value determined by each of a plurality of value indexes included in the value reference information identified and (ii) a value associated in advance with each of the plurality of value indexes; and
- determining the incentive based on the value of the used data calculated, the value associated in advance is determined to change over time, and the method further comprises transferring third transaction data including the value determined to an other computer and storing a third block including the third transaction data in a distributed ledger managed by a computer, the transferring and the storing being performed by the computer.

8. A server which determines an incentive for one or more data providers who provide data generated by one or more apparatuses, the server comprising:
a processor; and
a memory,
wherein, using the memory, the processor:
records provision record information in which provider identification information, data identification information, and value reference information are associated with one another, the provider identification information identifying each of the one or more data providers, the data identification information identifying each of one or more items of provided data that are data provided by the one or more data providers, the value reference information serving as a reference for calculating a data value of each of the one or more items of provided data; and when the one or more items of provided data include used data that is data used by a data user, determines an incentive for a data provider of the used data among the one or more data providers based on the provision record information, wherein the value reference information includes an index value determined by each of a plurality of value indexes, and in the determining of the incentive, the processor:
identifies, based on the provision record information, (i) provided data associated with data identification information that is identical to data identification information which identifies the used data, and (ii) value reference information of the provided data identified and a data provider of the provided data identified; and determines an incentive for the data provider identified, based on the value reference information identified.

9. A non-transitory computer-readable recording medium having recorded thereon a program for causing a computer to execute the method according to claim 1.

* * * * *